United States Patent
Okada et al.

(10) Patent No.: US 8,228,390 B2
(45) Date of Patent: Jul. 24, 2012

(54) IMAGE TAKING APPARATUS WITH SHAKE CORRECTION, IMAGE PROCESSING APPARATUS WITH SHAKE CORRECTION, IMAGE PROCESSING METHOD WITH SHAKE CORRECTION, AND IMAGE PROCESSING PROGRAM WITH SHAKE CORRECTION

(75) Inventors: Miyuki Okada, Kanagawa (JP); Hirofumi Nomura, Saitama (JP); Takashi Tsujimura, Kanagawa (JP)

(73) Assignee: Sony Corporation, Tokyo (JP)

( * ) Notice: Subject to any disclaimer, the term of this patent is extended or adjusted under 35 U.S.C. 154(b) by 626 days.

(21) Appl. No.: 11/924,158

(22) Filed: Oct. 25, 2007

(65) Prior Publication Data

US 2008/0186386 A1 Aug. 7, 2008

(30) Foreign Application Priority Data

Nov. 30, 2006 (JP) .................................. 2006-325015

(51) Int. Cl.
*H04N 5/228* (2006.01)
*H04N 5/222* (2006.01)

(52) U.S. Cl. ............... 348/208.6; 348/208.1; 348/208.2; 348/208.14; 348/333.03

(58) Field of Classification Search .............. 348/208.14
See application file for complete search history.

(56) References Cited

U.S. PATENT DOCUMENTS

| 5,991,428 | A * | 11/1999 | Taniguchi | 382/107 |
|---|---|---|---|---|
| 6,501,794 | B1 * | 12/2002 | Wang et al. | 375/240.08 |
| 6,734,902 | B1 * | 5/2004 | Kawahara | 348/208.8 |
| 6,870,960 | B2 * | 3/2005 | Ogawa | 382/236 |
| 7,899,208 | B2 * | 3/2011 | Kondo et al. | 382/103 |
| 2003/0071908 | A1 * | 4/2003 | Sannoh et al. | 348/345 |
| 2006/0115297 | A1 * | 6/2006 | Nakamaru | 399/163 |
| 2006/0251409 | A1 * | 11/2006 | Tabuchi et al. | 396/52 |
| 2007/0019937 | A1 * | 1/2007 | Endo | 396/52 |
| 2007/0269112 | A1 * | 11/2007 | Yamamoto | 382/195 |
| 2009/0153678 | A1 * | 6/2009 | Nonaka et al. | 348/208.4 |

FOREIGN PATENT DOCUMENTS

JP 5-316404 11/1993

OTHER PUBLICATIONS

U.S. Appl. No. 12/541,477, filed Aug. 14, 2009, Okada.

* cited by examiner

*Primary Examiner* — Ngoc-Yen Vu
(74) *Attorney, Agent, or Firm* — Oblon, Spivak, McClelland, Maier & Neustadt, L.L.P.

(57) ABSTRACT

In an image taking apparatus, an imaging unit senses an image of a subject, and a face detection unit detects a face in the image sensed by the imaging unit. A motion detection unit detects an amount of face motion indicating an amount of shake of an area of the face detected by the face detection unit in the image sensed by the imaging unit and also detects an amount of background motion indicating an amount of shake of an area other than the face area. A shake correction unit corrects the shake of the image sensed by the imaging unit according to the amount of face motion and the amount of background motion detected by the motion detection unit.

36 Claims, 19 Drawing Sheets

IMAGE TAKING APPARATUS WITH SHAKE CORRECTION, IMAGE PROCESSING APPARATUS WITH SHAKE CORRECTION, IMAGE PROCESSING METHOD WITH SHAKE CORRECTION, AND IMAGE PROCESSING PROGRAM WITH SHAKE CORRECTION

CROSS REFERENCES TO RELATED APPLICATIONS

The present invention contains subject matter related to Japanese Patent Application JP 2006-325015 filed in the Japanese Patent Office on Nov. 30, 2006, the entire contents of which are incorporated herein by reference.

BACKGROUND OF THE INVENTION

1. Field of the Invention

The present invention relates to an image taking apparatus, and more particularly, to an image taking apparatus capable of correcting a shake of an image, an apparatus and method for processing an image to correct a shake of an image, and a computer program for implementing the method on a computer.

2. Description of the Related Art

In recent years, an image taking apparatus such as a digital still camera, a digital video camera, and a camera usable as both a still camera and a motion camera has become increasingly popular, and a great improvement in performance thereof has been achieved. However, when an image of a subject is taken by an image taking apparatus held in a hand, two types of shakes can occur. One is a shake of the image taking apparatus, and the other is a shake of the subject.

One technique to detect such a shake is to use a sensor such as a vibration sensor, a velocity sensor, an acceleration sensor, or a gravitational sensor to detect the shake. Another technique is to detect a motion vector by image processing.

The blur of the image taken by the image taking apparatus due to the shake can be prevented or suppressed by moving the position of the image in a direction opposite to a shake direction in accordance with the result of detection of the shake. One method of preventing/suppressing the shake is to electronically compensate for the shake by shifting a reading address of an image sensor shifting a writing/reading address of an image memory. Another method is to optically compensate for the shake by shifting/tilting a shake compensation lens, deforming/tilting a shake compensation prism, or shifting an image sensor.

For example, it has been proposed to sample a shake signal output from a shake sensor in synchronization with a sample timing signal depending on a shutter speed supplied from a timing generator, and control a reading address of an image signal output from an image sensor in accordance with the sampled shake signal (for example, see Japanese Unexamined Patent Application Publication No. 05-316404).

SUMMARY OF THE INVENTION

In the techniques described above, the shake compensation is made uniformly for all parts of an image regardless of a subject included in the image. In other words, the shake compensation is made uniformly for the image as a whole.

However, in the shake compensation techniques described above, because a subject such as a human figure and a background included in an image are treated in the same manner without taking into account motion of the subject, there is a possibility that a blur occurs at a face, eyes, a nose, a mouth, etc. of the human figure. To prevent the above problem, it is desirable to provide a technique to properly correct not only the global shake of the image but also local shakes of parts such as a face of a human figure included in the image.

According to an embodiment of the present invention, there are provided an image taking apparatus, a method for the image taking apparatus to process an image, and a program executable by a computer to process an image, the image taking apparatus including imaging means for sensing an image of a subject, face detection means for detecting a face in the image sensed by the imaging means, motion detection means for detecting an amount of face motion indicating an amount of shake of an area of the face detected, by the face detection means, in the image sensed by the imaging means and also detecting an amount of background motion indicating an amount of shake of an area other than the face area, and shake correction means for correcting the shake of the image sensed by the imaging means according to the amount of face motion and the amount of background motion detected by the motion detection means. Thus, if a face is detected in an image, an amount of face motion indicating an amount of shake of an area of the face in the image and an amount of background motion indicating an amount of shake of an area other than the face area are detected, and the shake of the image is corrected according to the detected amount of face motion and the amount of background motion.

The image taking apparatus may further include correction value calculation means for calculating the correction value of the shake of the image to be corrected by the shake correction means, in accordance with the amount of face motion and the amount of background motion detected by the motion detection means. This makes it possible to calculate the correction value of the shake of the image in accordance with the amount of face motion and the amount of background motion detected in the image. In this case, the correction value calculation means may calculate the correction value in accordance with the amount of face motion and the amount of background motion detected by the motion detection means and in accordance with predetermined weighting factors. This makes it possible to calculate the correction value in accordance with the amount of face motion and the amount of background motion detected in the image and in accordance with predetermined weighting factors. In this case, the correction value calculation means may calculate the correction value by applying a greater weighting factor to the amount of face motion detected by the motion detection means than to the amount of background motion detected by the motion detection means. That is, the correction value associated with the shake of the image is calculated by applying a greater weighting factor to the amount of face motion than to the amount of background motion.

In the image taking apparatus, the face detection means may further detect feature information associated with the face detected in the image sensed by the imaging means, and the correction value calculation means may calculate the weighting factors in accordance with the feature information associated with the face detected by the face detection means. That is, feature information associated with the face in the image is detected, and the weighting factor is calculated in accordance with the detected feature information associated with the face. In this case, the feature information associated with the face may include one or more pieces of information selected from the group consisting of information indicating a face area size, information indicating coordinates of the face area, the likelihood of being a face, information indicating the degree of facing forward, information indicating the degree of tilt of the face, information indicating the degree of smiling, information indicating the degree of being serious, and information indicating the degree of closing of eyes. That is, the weighting factor may be calculated on the basis of the feature information including one or more pieces of information selected from the group consisting of information indicating a face area size, information indicating coordinates of the face area, the likelihood of being a face, information indicating the degree of facing forward, information indicating the degree of tilt of the face, information indicating the degree of smiling, information indicating the degree of being serious, and information indicating the degree of closing of eyes.

In the calculation of the correction value, the correction value calculation means may increase the weighting factor for blocks located close to the face detected by face detection means. That is, in the calculation of the correction value, the correction value calculation means increases the weighting factor for blocks located close to the face detected in the image.

In the image taking apparatus, the motion detection means may divide the image sensed by the imaging means into a plurality of areas such that the face detected by the face detection means is included in one of the areas, detect the amount of face motion from the area including the face, and detect the amount of background motion from areas other than the area including the face. That is, the image sensed by the imaging means is divided into a plurality of areas such that the face detected by the face detection means is included in one of the areas, and the amount of face motion from the area including the face is detected and furthermore the amount of background motion from areas other than the area including the face is detected.

The image taking apparatus may further include vibration detection means for detecting an amount of shake due to a vibration of the image taking apparatus, and the shake correction means may correct the shake of the image sensed by the imaging means in accordance with the amount of face motion and the amount of background motion detected by the motion detection means and the amount of shake detected by the vibration detection means. That is, the shake of the image is corrected in accordance with the detected amount of face motion and the amount of background motion and the detected amount of shake of the image taking apparatus.

The image taking apparatus may further include camera control value detection means for detecting the degree of whether focus and/or exposure are set optimally for the face detected by the face detection means, based on the feature information associated with the face, and the correction value calculation means may calculate the correction value for the face in accordance with the degree of whether focus and/or exposure are set optimally for the face, detected by the camera control value detection means. That is, the correction value for the face is calculated in accordance with the degree of whether focus and/or exposure are set optimally for the face.

The image taking apparatus may further include setting means for setting whether detection of a face in the image sensed by the imaging means should be performed. That is, setting is made as to whether detection of a face in the image should be performed thereby selecting whether the correction of the shake of the image taking into account the face motion should be performed or not.

The image taking apparatus may further include specific person storage means for storing specific person information associated with a face of a specific person, and specific person identification means for determining whether the face detected by the face detection means is identical to the face of the specific person stored in the specific person storage means, and the correction value calculation means may calculate the correction value such that if the specific person identification means determines that the face detected by the face detection means is identical to the face of the specific person stored in the specific person storage means, the correction value calculation means modifies the weighting factor for each area depending on whether the area includes the face of the specific person. That is, if it is determined that the face detected in the image is identical to the face of the specific person, the weighting factor for each area is modified depending on whether the area includes the face of the specific person, and the correction value of the shake of the image is calculated using the modified weighting factors.

In the image taking apparatus, the correction value calculation means may calculate a first average value indicating the average of the amounts of face motion detected by the motion detection means, calculate the correction value for the area of the face detected by the face detection means in accordance with the first average value, calculate a second average value indicating the average of the amounts of background motion detected by the motion detection means, and calculate the correction value for areas other than the area of the face detected by the face detection means in accordance with the second average value. That is, the correction value for the area of the face is calculated in accordance with the average value of the amounts of face motion, and the correction value for areas other than the area of the face is calculated in accordance with the average value of the amounts of background motion.

In the image taking apparatus, if a plurality of faces are detected by the face detection means, the correction value calculation means may calculate the average value of the amounts of face motion for each of the faces detected by the face detection means and calculates the correction value in accordance with the calculated average value. That is, when a plurality of faces are detected, the average value of the amounts of face motion is calculated for each face, and the correction value is calculated separately for each face in accordance with the average value.

In the image taking apparatus, the shake correction means may correct the shake of the image sensed by the imaging means such that the area of the face detected by the face detection means is moved toward the center of the image. That is, the shake of the image is corrected such that the area of the face detected in the image is moved toward the center of the image.

In the image taking apparatus, the motion detection means may detect the amount of face motion of the area of the face, detected by the face detection means, in the image sensed by the imaging means on the basis of the correlation between the face detected by the face detection means from the current image detected by the imaging means and a face detected by the face detection means from a previous image detected by the imaging means a predetermined time before the current image. That is, the motion detection means detects the amount of face motion of the area of the face, detected by the face detection means, in the image sensed by the imaging means on the basis of the correlation between the face detected by the face detection means from the current image detected by the imaging means and a face detected by the face detection means from a previous image detected by the imaging means a predetermined time before the current image.

According to an embodiment of the present invention, there are provided an image taking apparatus, a method for the image taking apparatus to process an image, and a program executable by a computer to process an image, the image taking apparatus including image input means for inputting an image, face detection means for detecting a face in the image input via the image input means, motion detection means for detecting an amount of face motion indicating an amount of shake of an area of the face detected, by the face detection means, in the image input via the image input means and also detecting an amount of background motion indicating an amount of shake of an area other than the face area, and shake correction means for correcting the shake of the image input via the image input means according to the amount of face motion and the amount of background motion detected by the motion detection means. That is, if a face is detected in the input image, an amount of face motion indicating an amount of shake of an area of the face in the input image and an amount of background motion indicating an amount of shake of an area other than the face area are detected, and the shake of the input image is corrected according to the detected amount of face motion and the amount of background motion.

As described above, the present invention provides the great advantage that the shake of the image can be correctly properly depending on the image.

DESCRIPTION OF THE PREFERRED EMBODIMENTS

The present invention is described in further detail below with reference to embodiments in conjunction with the accompanying drawings.

Figure 1:
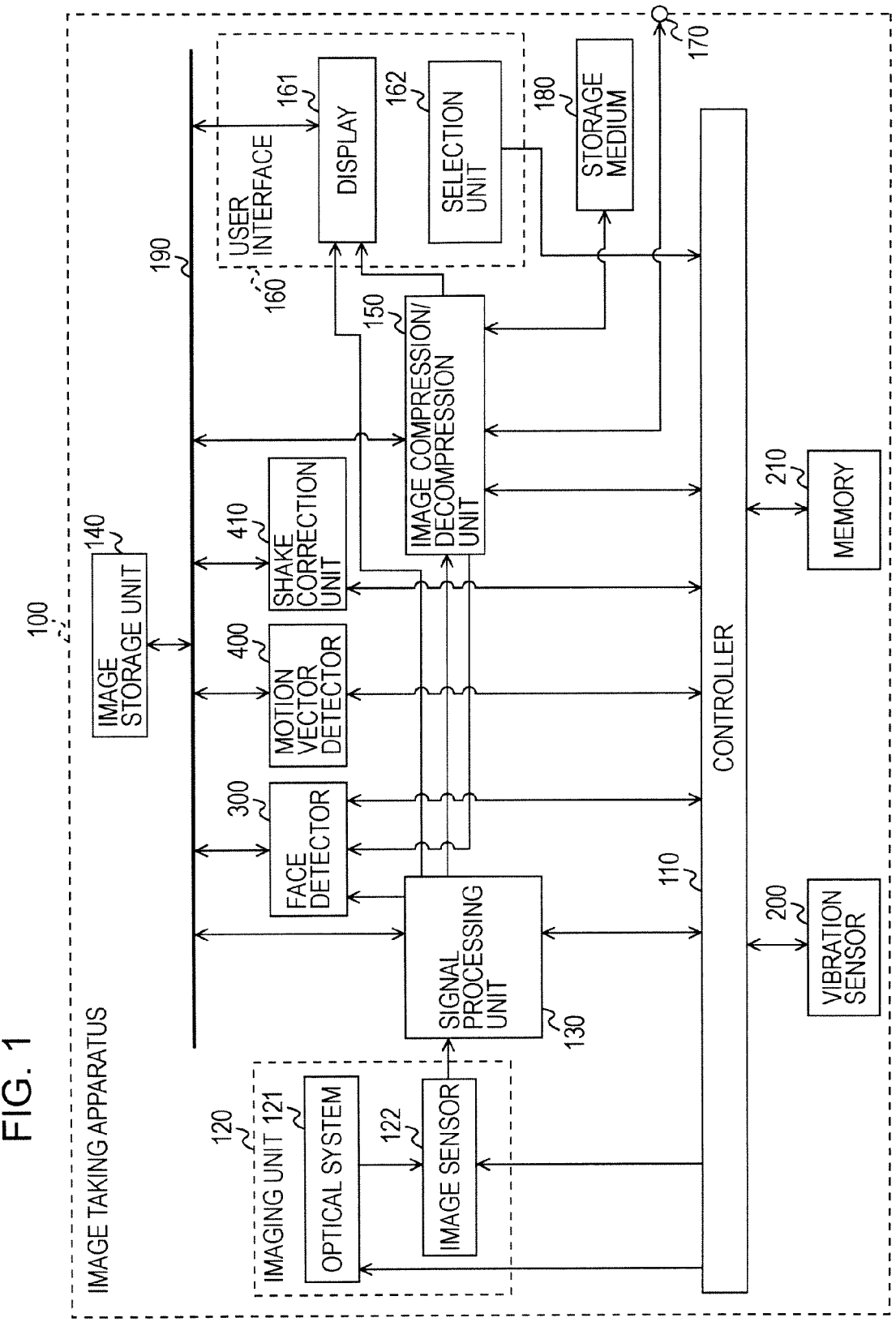
FIG. 1 is a functional block diagram of an image taking apparatus according to an embodiment of the present invention.

FIG. 1 is a functional block diagram of an image taking apparatus 100 according to an embodiment of the present invention. Specific examples of the image taking apparatus 100 include a digital still camera and a digital video camera, which may be of a standalone type or a type embedded in other apparatus such as a portable telephone or a personal computer.

The image taking apparatus 100 includes a controller 110, an imaging unit 120, a signal processing unit 130, an image storage unit 140, an image compression/decompression unit 150, a user interface 160, an input/output unit 170, a storage medium 180, a bus 190, a vibration sensor 200, a memory 210, a face detector 300, motion vector detector 400, and a shake correction unit 410. Transmission of an image signal among the above-described blocks is performed directly or via the image storage unit 140 or a bus 190.

The controller 110 is a unit for controlling various parts of the image taking apparatus 100 in accordance with control programs stored in a memory (not shown).

The imaging unit 120 includes an optical system 121 and an image sensor 122, and serves to convert incident light from a subject into an electric signal and supplies the resultant electric signal to the signal processing unit 130. The optical system 121 includes a set of lenses including, for example, a focus lens, a zoom lens, a shake correction lens, and/or a shake correction prism, and is adapted to direct incident light coming from the subject onto the image sensor 122 via the set of lenses. The image sensor 122 converts the incident light supplied from the optical system 121 into an electric signal and supplies the resultant electric signal to the signal processing unit 130. In the imaging unit 120, the detected shake is optically corrected by controlling the position and/or the tilt of the shake correction lens, the deformation and/or the tilt of the shake correction prism, and/or the position of the image sensor 122. Note that the shake correction is performed under the control of the controller 110.

The signal processing unit 130 performs various kinds of signal processing on the electric signal supplied from the image sensor 122 and supplies image data obtained as a result of the signal processing to the image storage unit 140, the image compression/decompression unit 150, the user interface 160, and the face detector 300. The signal processing performed by the signal processing unit 130 includes a noise reduction process, a level correction process, an analog-to-digital conversion process, and a color correction process. The signal processing unit 130 also performs various kinds of image processing on an image input from various parts under the control of the controller 110.

The image storage unit 140 serves to store image data to be processed in the image taking apparatus 100.

The image compression/decompression unit 150 serves to compress or decompress image data in the image process. More specifically, for example, image data is compressed by the image compression/decompression unit 150, and resultant compressed image data is supplied to the storage medium 180 and stored therein. On the other hand, image data decompressed by the image compression/decompression unit 150 is supplied to the image storage unit 140, the display 161, and the face detector 300. In the compression process, image data may be compressed, for example, into a JPEG (Joint Photographic Experts Group) format.

The user interface 160 includes the display 161 and a selection unit 162 and serves to interface with a user who uses the image taking apparatus 100.

The display 161 serves to display an image in accordance with image data output from the signal processing unit 130 or the image compression/decompression unit 150 More specifically, for example, the display 161 displays an image of a subject taken by the image taking apparatus 100.

If a user input selection information to the selection unit 162, the selection unit 162 converts the input selection information into an electric signal and outputs the resultant electric signal to the controller 110. More specifically, for example, if the face detector 300 detects a face in an image output from the imaging unit 120, the image taking apparatus 100 performs the shake correction process on the image based on the detected by the face. As described above, in accordance with the selection information input by the user via the selection unit 162, the shake correction mode is turned on or off. When the captured image includes a face, if the shake correction mode is in the on-state, the shake correction process based on the face is performed. However, if the shake correction mode is in the off-state, the shake correction process based on the face is not performed.

The user interface 160 may be configured, for example, such that the display 161 and the selection unit 162 are integrated into the form of a touch panel. Alternatively, the display 161 and the selection unit 162 may be configured separately such that the display 161 is implemented by a liquid crystal display (LCD) and the selection unit 162 is implemented by a hard key.

The input/output unit 170 serves to output image data received from the image compression/decompression unit 150 to an external apparatus such as an external storage medium, and also serves to transfer image data input from the external storage medium to the image compression/decompression unit 150.

The storage medium 180 stores image data supplied from the image compression/decompression unit 150, and, conversely, supplies image data stored therein to the image compression/decompression unit 150. Various kinds of storage media may be used as the image storage medium. Specific examples include a magnetic disk, an optical disk, a semiconductor storage medium, and a magnetic tape. The image storage medium may be implemented in the form of a removable storage medium or a built-in storage medium.

The bus 190 is used in common by various parts to transmit image data.

The vibration sensor 200 detects an image-independent shake component, that is, a vibration of the image taking apparatus 100 itself. Information associated with the detected vibration is output to the controller 110. The vibration sensor 200 may be implemented, for example, by a gyroscopic sensor, a velocity sensor, or an acceleration sensor.

The memory 210 is a volatile or nonvolatile memory for storing various kinds of information.

The face detector 300 serves to detect a face included in an image represented by input image data. The details of the face detector 300 will be described later with reference to FIG. 2.

The motion vector detector 400 performs image processing to detect motion vectors of respective blocks of an image of input image data, and supplies values corresponding to detected vectors to the controller 110.

The shake correction unit 410 corrects the shake of the image by moving the position of the image of the input image in accordance with the shake correction value calculated based on the motion vector detected by the motion vector detector 400. The shake correction unit 410 includes electronic shake correction mechanism and optical shake correction mechanism as will be described in detail later with reference to FIG. 14.

The image whose shake was corrected by the shake correction unit 410 is supplied to the image compression/decompression unit 150. The image compression/decompression unit 150 compresses the image received from the shake correction unit 410 and stores the resultant compressed image in the storage medium 180. The image whose shake was corrected by the shake correction unit 410 is also supplied to the display 161 and displayed thereon.

Figure 2:
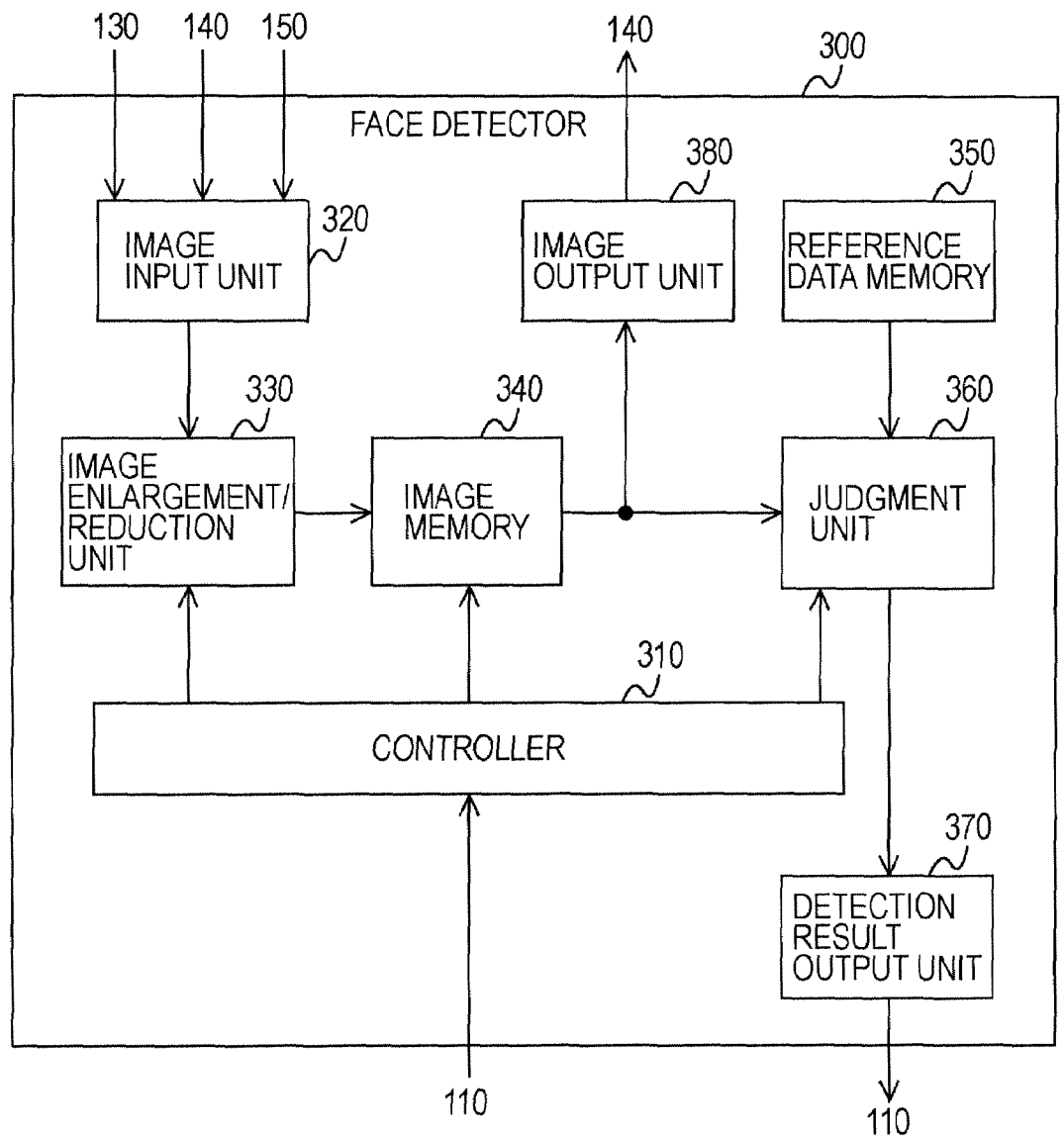
FIG. 2 is a functional block diagram of a face detector according to an embodiment of the present invention.

FIG. 2 is a block diagram illustrating an example of a functional configuration of the face detector 300.

The face detector 300 includes a controller 310, an image input unit 320, an image enlargement/reduction unit 330, an image memory 340, a reference data memory 350, a judgment unit 360, a detection result output unit 370, and an image output unit 380.

The controller 310 controls various parts of the face detector 300 in accordance with a command issued by the controller 110.

The image input unit 320 functions such that when image data is input to the image input unit 320 from the signal processing unit 130, the image storage unit 140, or the image compression/decompression unit 150, the image input unit 320 supplies the input image data to the image enlargement/reduction unit 330.

The image enlargement/reduction unit 330 enlarges or reduces the image data received from the image input unit 320 into a size suitable to detect a face. The enlargement/reduction ratio of the image is determined in accordance with a command supplied from the controller 110.

The image memory 340 stores the enlarge/reduced image output from the image enlargement/reduction unit 330.

The reference data memory 350 stores reference data of faces for use in the face detection process, and supplies the reference data to the judgment unit 360. The reference face data includes face images, data of general features of faces, and/or data of features of faces particular persons. In general, feature data is more advantageous as reference face data than face images in that the feature data can represent a greater number of faces with less data sizes.

The judgment unit 360 determines whether the image of the image data stored in the image memory 340 includes a face, and outputs a determination result to the detection result output unit 370. More specifically, the judgment unit 360 extracts a partial image with a predetermined window size from the image of the image data stored in the image memory 340, and determines whether the extracted partial image is of a face, by checking the correlation between the extracted partial image and the face data stored in the reference data memory 350. The determination described above is performed repeatedly thereby determining whether the image of the image data stored in the image memory 340 includes a face.

If the image of the image data stored in the reference data memory 350, the judgment unit 360 extracts various kinds of information associated with the face detected in the image based on the correlation between the detected face and the face data stored in the reference data memory 350, and the judgment unit 360 supplies the extracted information as a face detection result to the detection result output unit 370.

If the detection result output unit 370 receives the determination result and the face detection result from the judgment unit 360, the detection result output unit 370 transfers the received determination result and the face detection result to the controller 110.

The image output unit 380 serves to output the image stored in the image memory 340 to the image storage unit 140.

The face detection result output from the face detector 300 has the following values.

That is, the face detection result output from the face detector 300 includes following six face evaluation values (1) to (6) indicating features of the detected face.

(1) area of the face (corresponding to the distance from the camera)

(2) location of the face (the distance from the center of the image)

(3) value indicating the likelihood of being a face (4) angle of the face (facing forward, right, left, up, or down)

(5) degree of tilt of the face (6) viewed part (upper, lower, left, or right part) of the face In addition to the face evaluation values (1) to (6) described above, the face detection result may further include following face evaluation values (7) to (9) indicating the expression of the face or indicating a state of a part of the face.

(7) degree of smiling (8) degree of being serious (9) degree of closing (blinking) of eyes Based on the face evaluation values given to respective blocks of the image, weighting factors of motion vectors of the respective blocks are determined.

Figure 3:
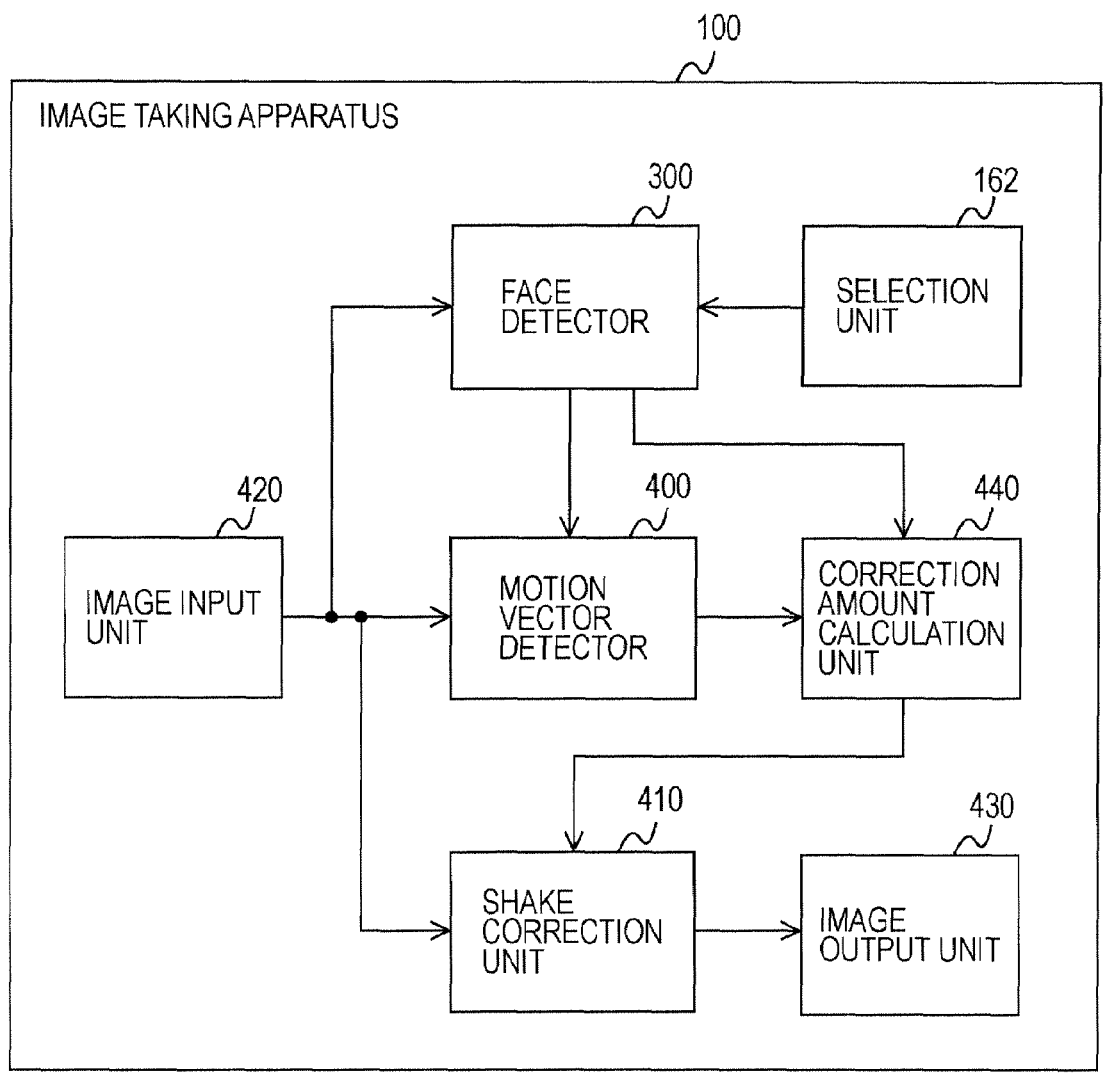
FIG. 3 illustrates an example of a functional configuration, associated with an image shake correction process, of an image taking apparatus according to an embodiment of the present invention.

FIG. 3 illustrates an example of a functional configuration, associated with the image shake correction process, of the image taking apparatus 100 according to an embodiment of the present invention.

The image taking apparatus 100 includes an image input unit 420, a face detector 300, a motion vector detector 400, a shake correction unit 410, an image output unit 430, a correction value calculation unit 440, and a selection unit 162.

The image input unit 420 is a unit for inputting an image and transferring the input image to the face detector 300, the motion vector detector 400, and the shake correction unit 410.

The face detector 300 is similar to the face detector 300 described above with reference to FIGS. 1 and 2, and serves to a face in an image output from the image input unit 420 and supplies a detection result to the motion vector detector 400 and the correction value calculation unit 440. Note that the face detector 300 performs or does not perform the face detection process depending on whether the face detection mode is set into an on-state or an off-state according to a command input via the selection unit 162.

The motion vector detector 400 detects a motion vector of the image supplied from the image input unit 420 by performing image processing, and supplies the detected motion vector to the correction value calculation unit 440. The motion vector detected by the motion vector detector 400 will be described in detail later with reference to FIGS. 4 to 14.

The correction value calculation unit 440 calculates the shake correction value by weighting the motion vectors output from the motion vector detector 400, based on various information associated with the face detected by the face detector 300, and outputs the resultant shake correction value to the shake correction unit 410. The calculation of the shake correction value performed by the correction value calculation unit 440 will be described in further detail later with reference to FIGS. 4 to 14.

In accordance with the shake correction value supplied from the correction value calculation unit 440, the shake correction unit 410 moves the position of the image output from the image input unit 420 thereby compensating for the shake of the image.

The image output unit 430 serves to output the image whose shake has been compensated for by the shake correction unit 410. The image output unit 430 corresponds to, for example, the display 161 adapted to display an image. The image output unit 430 also corresponds to the input/output unit 170 for inputting/outputting image data of an image from/to an external apparatus. Image data of an image may be stored in an image storage medium such as the storage medium 180 and may be stored in the external apparatus via the storage medium.

The selection unit 162 is similar to the selection unit 162 shown in FIG. 1 and serves to output, the face detector 300, selection information indicating whether the face correction mode is in the on-state or the off-state, in accordance with a command input by a user.

Now, a process of detecting the motion vector by performing image processing using a block matching method is described below.

Figure 4:
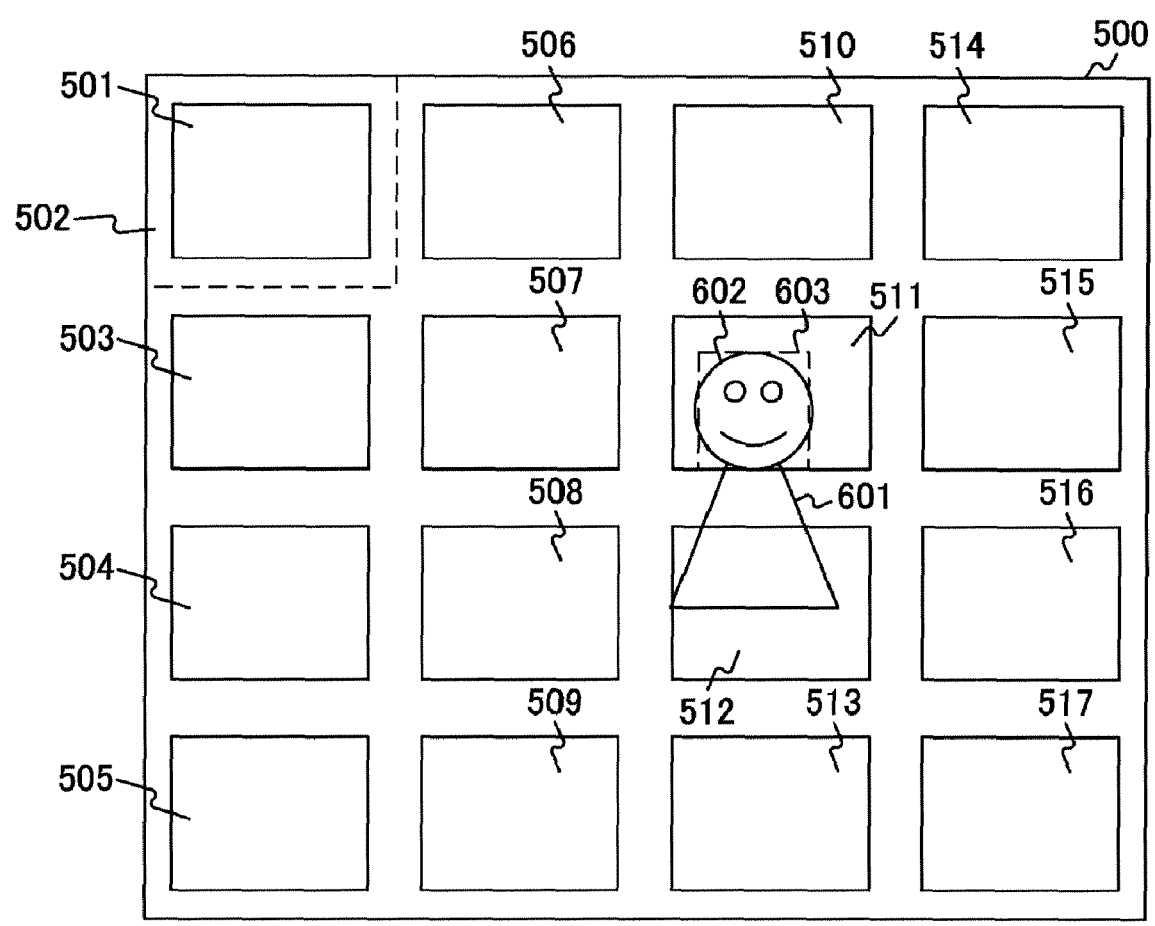
FIG. 4 illustrates an example of a manner in which a motion vector detector divides an image into a plurality of parts in a process of detecting a motion vector of the image by a block matching method.

FIG. 4 illustrates an example of a manner in which an image is divided into blocks by the motion vector detector 400 in a process of detecting the motion vector of the image by the block matching method.

In the process of detecting the motion vector by the image processing based on the block matching method, each of frames which are successive in time, of a motion image is divided into a plurality of bocks as shown in FIG. 4, and blocks similar to blocks in a current frame are detected from a previous frame. On the basis of difference in location between similar blocks, motion vectors of the respective blocks are determined.

More specifically, in the process of detecting the motion vector of the image 500 by the image processing based on the block matching method, motion vector detector 400 divides the frame of image 500 into a plurality of blocks. The simplest way of dividing the image is to vertically and horizontally divide the image into equal blocks. In the example shown in FIG. 4, the image 500 is divided into 16 equal blocks. The blocks of the image are sequentially selected as a target block, a search area with a predicted maximum size within which the current target block is predicted to move is defined around the target block, and the motion vector of the target block within the defined search area is calculated. In the example shown in FIG. 4, a block 501 is selected as a target block from 16 blocks (501 and 503 to 517) of the image 500, and a search area 502 is defined around the current target block 501.

Figure 5:
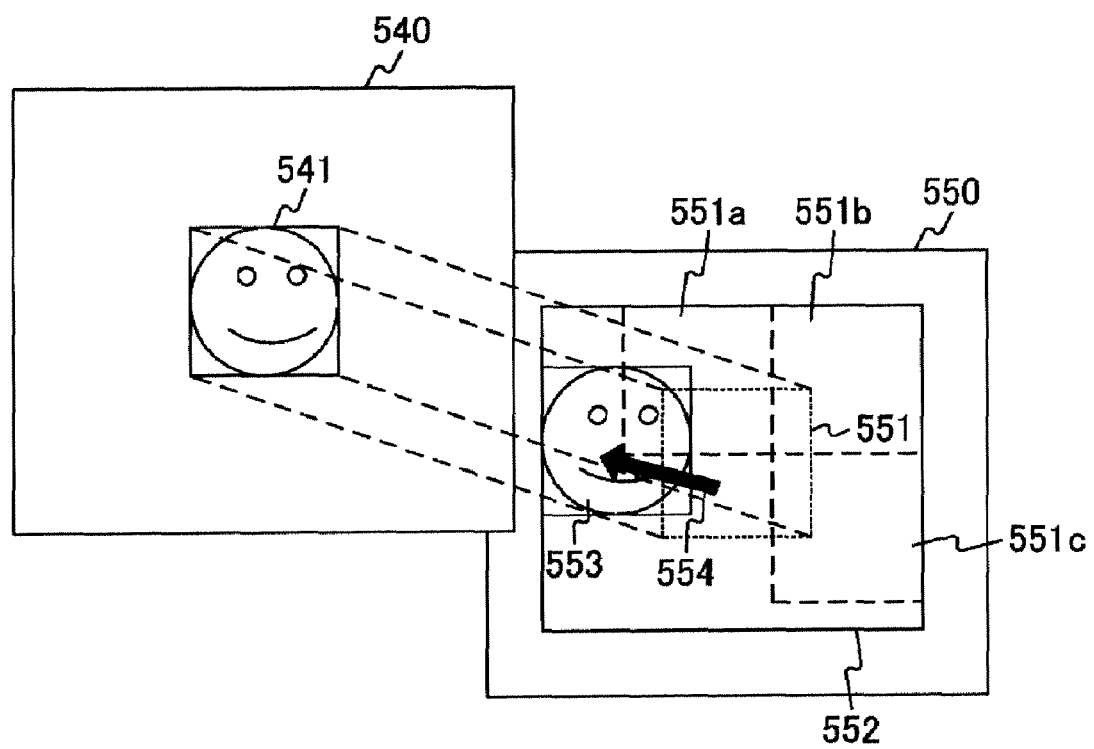
FIG. 5 illustrates an example of a relationship between a current frame and a previous frame in a process performed by a motion vector detector to detect a motion vector of an image by a block matching method.

FIG. 5 illustrates an example of a relationship between a previous frame 540 and a current frame 550 in the process performed by the motion vector detector 400 to detect the motion vector of the image by the image processing based on the block matching method.

The previous frame 540 and the current frame 550 are two successive frames of a sequence of frames of the motion image. In FIG. 5, a target block 541 is placed in the previous frame 540. The target 541 is projected onto a target block 551 in the current frame 550 such that the target 551 is at the same location as the location of the target block 541, and a search area 552 is defined around the target block 551. In FIG. 5, for ease of understanding, the target block 541 in the previous frame 540 and the target block 551 and the search area 552 in the current frame 550 are drawn in an enlarged fashion. The search area may be defined such that the search area for the current target block overlaps a search area for a previous or other target block.

The target block 551 is moved within the search area 552 in the current frame 550. For example, areas 551a to 551c are moved, and an area having a highest correlation with the target block 541 in the previous frame 540 is searched for within the search area 552. In the example shown in FIG. 5, an area 553 is detected to have a highest correlation with the target block within the search area 552.

In the searching, if an area having a highest correlation with the target block 541 is detected in the search area 552, it is determined that the target block 541 in the previous frame 540 has moved to the location of the area 553 in the search area 552 of the current frame 550. A motion vector 554 is then determined based on the positional relationship between the target block 551 and the area 553 in the search area 552 in the current frame 550. In the motion vector detection by the image processing based on the block matching method, as described above, one motion vector is calculated for each target block. That is, the interframe correlation (matching) is evaluated for each of blocks, and the motion vector of each block is determined based on the interframe correlation.

As shown in FIG. 4, a global motion vector for one frame of image 500 as a whole is determined by calculating the average of motion vectors of respective blocks. Furthermore, the local motion vector of each block is determined by weighting the motion vector of each block.

In a case where the image 500 includes a face 602 of a human FIG. 601 as in the example shown in FIG. 4, the face detector 300 detects a face area 603 of the face 602, and the motion vector detector 400 detects the motion vector of the face area 603 as follows. That is, if the face area 603 detected by the face detector 300 is included in a target block 511 as in the case of the example shown in FIG. 4, the motion vector of the target block 511 including the face area 603 is detected. Thus, in the case where a face is included in a particular target block, it is possible to uniquely determine the motion vector of the face area using the above-described technique. Thus, it is possible to correctly detect the motion vector for the face area 603.

Figure 6A:
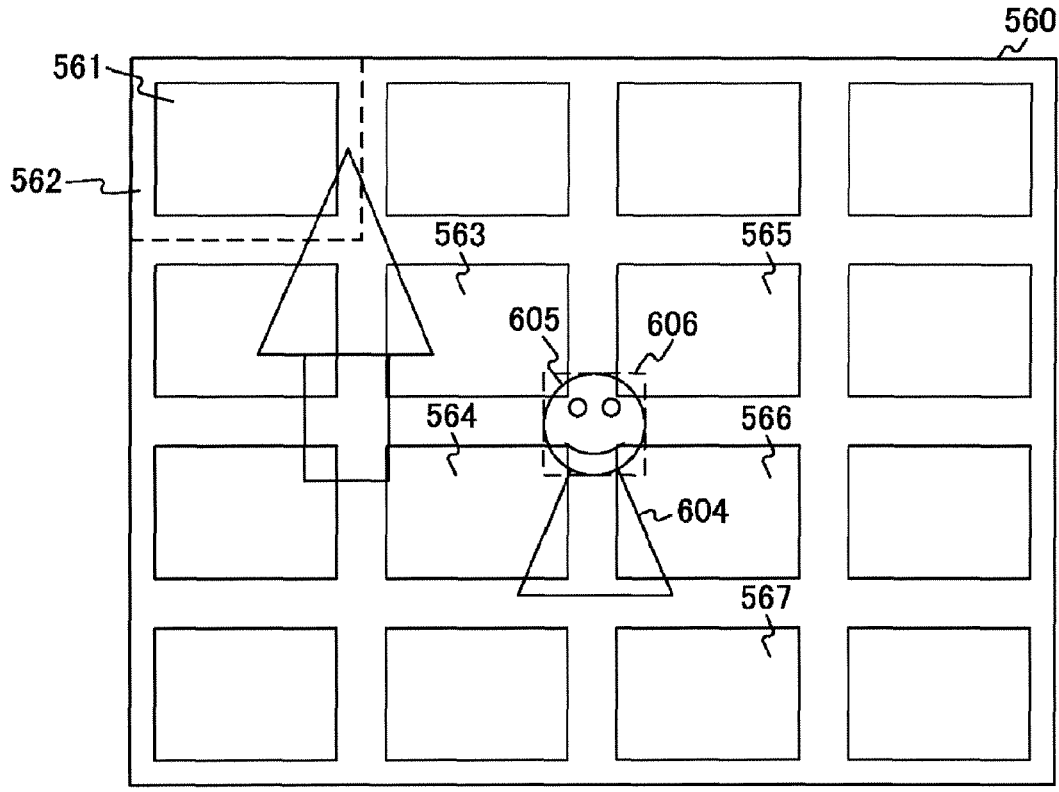
FIGS. 6A and 6B illustrate examples of manners in which a motion vector detector divides an image into a plurality of parts in a process of detecting a motion vector of the image by a block matching method.

On the other hand, in a case where a face area of a face 605 of a human FIG. 604 is detected by the face detector 300 in an image 560 divided into 16 blocks in such a manner as shown in FIG. 6A, motion vectors are determined as follows. In this case, the face area 606 detected by the face detector 300 is not completely included in one block, but included over a plurality of blocks 563 to 566. In this case, motion vectors of the blocks 563 to 566 in which the face 606 is partially included are detected. Thus, there is a possibility that the motion vector of the face area 606 is not correctly determined if the human FIG. 604 is moving. In the present embodiment, to avoid the above problem, when the motion vector detector 400 detects motion vectors of an image, the motion vector detector 400 divides the image in accordance with the face area detected by the face detector 300.

Figure 6B:
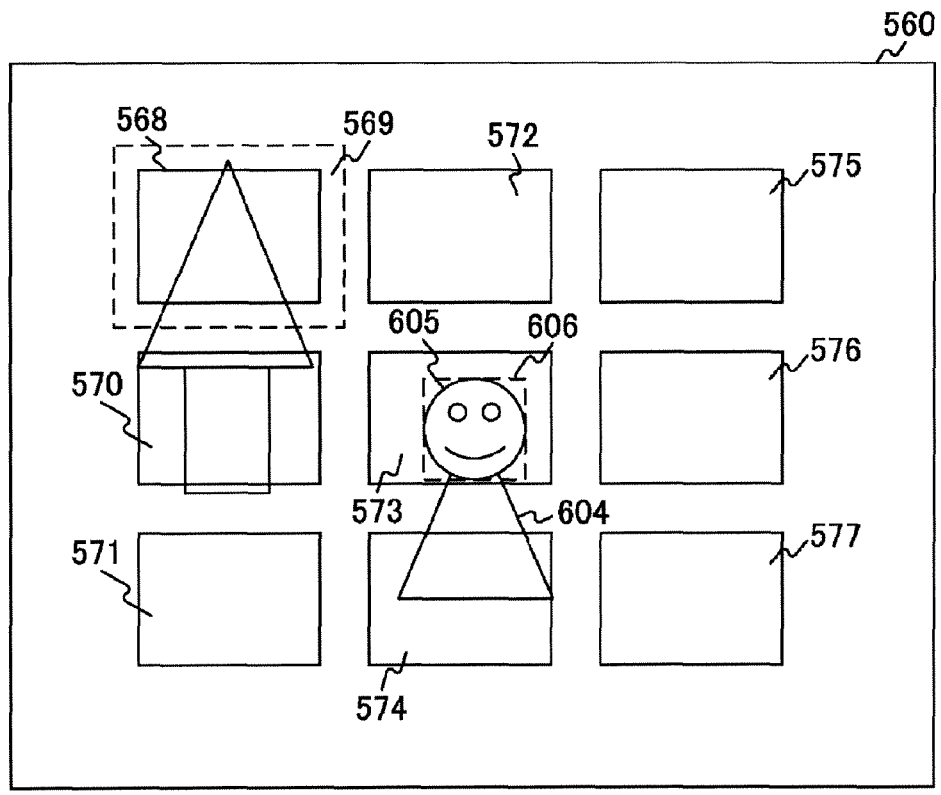

FIGS. 6A and 6B illustrate examples of manners in which the motion vector detector 400 divides an image into a plurality of blocks in the process of detecting motion vectors of an image by the image processing based on the block matching method.

In the example shown in FIG. 6A, as in the example shown in FIG. 4, an image 560 is simply divided into 16 blocks In this example, because the image is divided without taking into account the face area 606 detected by the face detector 300, the face area 606 is partially included in a plurality of blocks 563 to 566.

In the example shown in FIG. 6B, the image 560 is divided taking into account the face area 606 detected by the face detector 300 so that the face area 606 of the human FIG. 604 detected by the face detector 300 is completely included in one block 573 thereby ensuring that the motion vector of the face area 606 can be uniquely given by the motion vector of the block 573.

In contrast, in the example shown in FIG. 6A, the face area is partially included in a plurality of blocks, the motion vector of the face area cannot be uniquely given by the motion vector of one block. On the other hand, in the example shown in FIG. 6B, the image 560 is divided such that the face area is completely included in one block, and thus the motion vector of the face area can be uniquely given by the motion vector of one block. Thus, as far as the detection of the motion vector of the face area is concerned, this method of dividing the image is more advantageous than the method shown in FIG. 6A. In the examples described above, the image is divided into equal blocks. The image may be divided in a different manner as long as a face area is completely included in one block.

In the present embodiment, as described above, the coordinates of the face area detected by the face detector 300 are used in the process of detecting the motion vector of the image.

To suppress the shake component more effective for the face area than for the other parts, the motion vector of the block including the face area is weighted by a relatively large factor so as to have a great contribution to the global motion vector of the image. In the weighting process, as will be described in further detail later, the weighting factor is determined precisely depending on the size of the face area, the likelihood of being a face, the likelihood of facing forward, etc.

Figure 7:
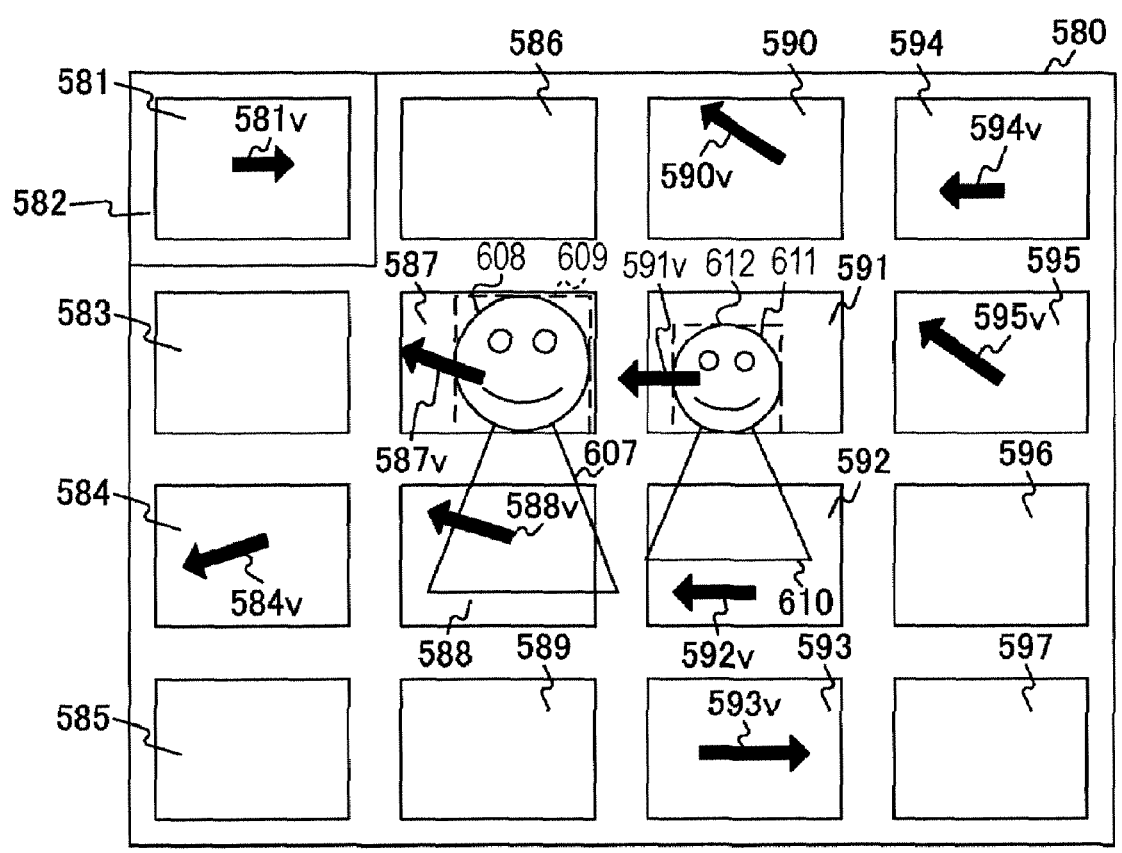
FIG. 7 illustrates an example of a motion vector of an image detected by a motion vector detector.

FIG. 7 illustrates examples of motion vectors detected by the motion vector detector 400 for various parts of an image 580.

In the example shown in FIG. 7, the image 580 is divided into 16 blocks and the motion vector is detected for each of these 16 blocks, as with the image 500 in FIG. 4. In the example shown in FIG. 7, the image 580 includes a human FIG. 607 and a human FIG. 610, and a face area 609 of the face 608 and a face area 612 of the face 611 are detected by the face detector 300. Thus, the blocks are placed so that the face area 609 is included in one of the block and the face area 612 is included in another one of the blocks. Arrows 581v, 584v, etc. denote motion vectors detected for blocks 581 to 597. As shown in FIG. 7, the motion vector is detected for each block.

Next, a method of calculating the weighting factors for the respective detected motion vectors is described below.

First, a method of calculating the weighting factors in accordance with various kinds of information associated with the detected face is described.

Figure 8:
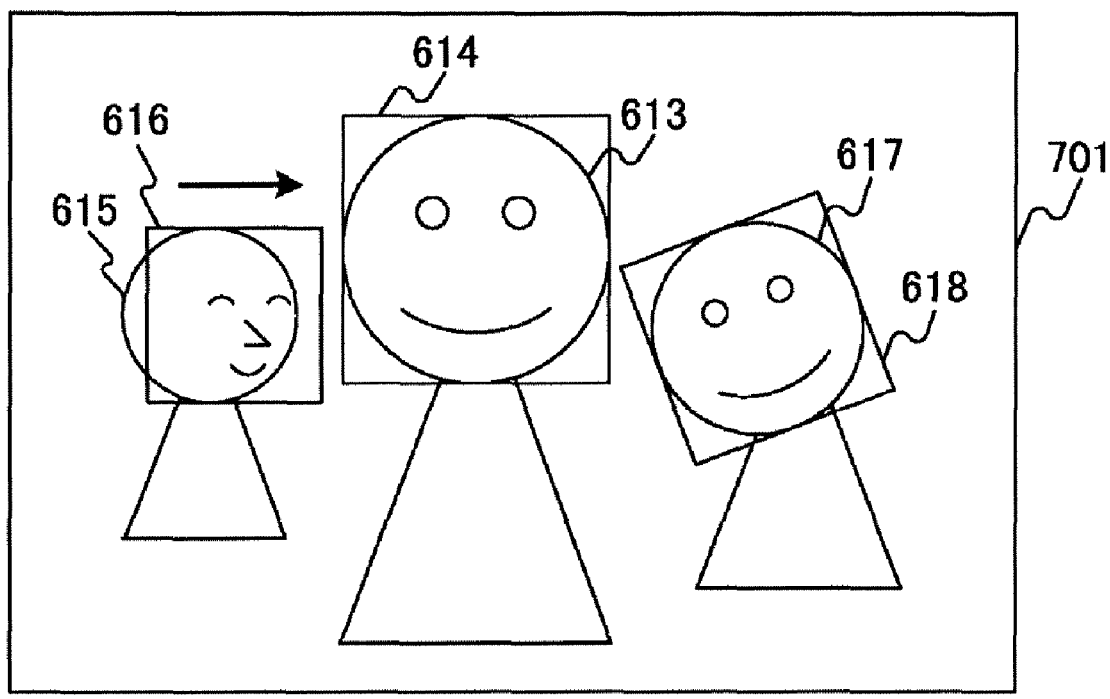
FIG. 8 illustrates an example of an image including faces of human figures.

FIG. 8 illustrates an example of an image 701 including three human faces 613, 615, and 617. As described above, after motion vectors are detected for various parts of the image, the detected motion vectors are not directly used to calculate the shake correction value, but the shake correction value is calculated using the motion vectors weighted by factors determined depending on the state of the subject. For example, when the image includes a human face, the weighting factor for each block of the image is determined depending on whether the block includes a face area. If a block includes a face area, a great weighting factor is assigned to this block so that the shake is suppressed more effectively in an area surrounding the face.

In a case where an image is divided into N blocks, weighting factors are calculated as follows. The weighting factors for blocks including no face area are given a predetermined value $w_n'=w_0$ (n=0 to N−1) where $w_0$ is initially set to be equal to 1/N. If a block includes a face area, the weighting factor $w_n'$ for this block is determined depending on a plurality of face evaluation values according to equation (1) as described below.

$$w_n' = w_0 \times (E_{01} \times \text{face area size}) + (E_{02} \times \text{coordinate of face area}) + \quad (1)$$
$$(E_{03} \times \text{value indicating the likelihood of being a face}) +$$
$$(E_{04} \times \text{degree of facing forward}) + (E_{05} \times \text{degree of tilting})$$

where $E_{01}$ to $E_{05}$ are predetermined weighting factors for the respective face evaluation values.

More specifically, the weighting factor for a block including a face area is increased with increasing size of the face area included in the block, with decreasing distance (coordinate) of the face area from the center of the frame, with increasing likelihood of being a face, with increasing degree of facing forward, and with decreasing degree of tilting.

After the weighting factors $w_0'$ to $w_{N-1}'$ are calculated for the respective N blocks in the above-described manner, the weighting factors $w_0'$ to $w_{N-1}'$ are normalized so that the sum thereof becomes equal to 1.

In the example shown in FIG. 8, a large weighting factor is given to the block including the face area 614 of the face 613 because the face area size is large, the face is located close to the center of the frame, the degree of facing forward is high, and the degree of tilting is low. However, a small weighting factor is given to a block including the face area 618 of the face 617, because the face area size is relatively small, the location of the face 617 is not close to the center of the frame, and the degree of tilting is relatively great. The block including the face area 616 of the face 615 is given a relatively small weighting factor, because the face area size is relatively small, the location of the face is not close to the center of the frame, and the degree of facing forward is low.

Next, a method of determining the weighting factors depending on the optimality degree of focus and exposure for a detected face is described.

FIGS. 9 to 12 show examples of images each including a plurality of human faces.

Figure 9A:
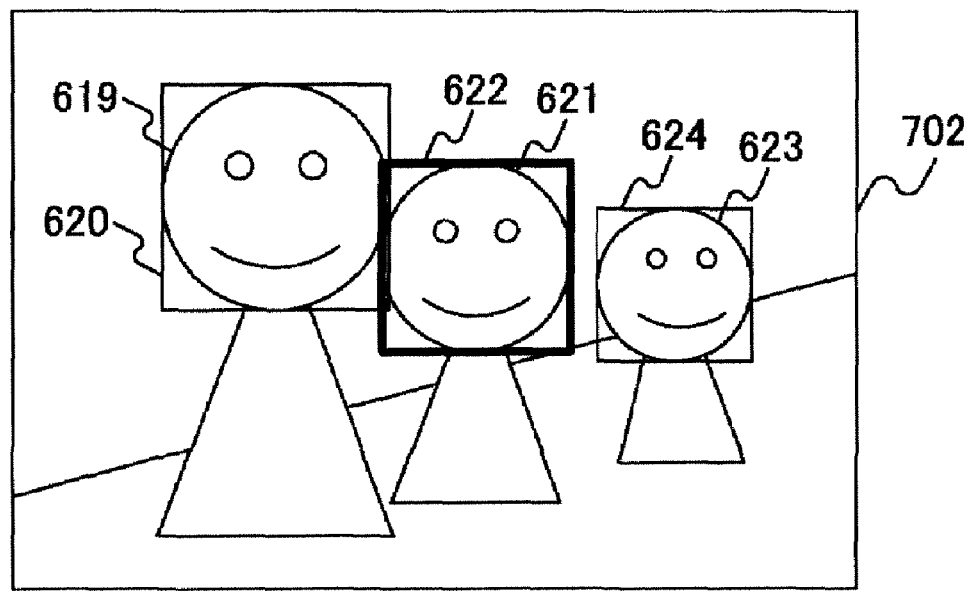
FIGS. 9A and 9B illustrate examples of images including faces of a plurality of human figures.
Figure 9B:
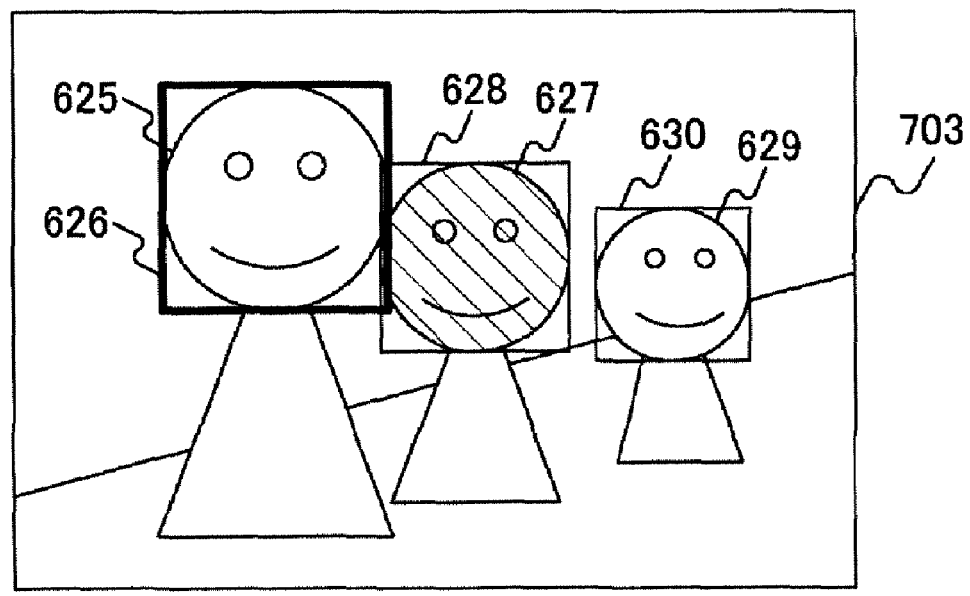

In the example shown in FIGS. 9A and 9B, an image includes a plurality of faces of human figures located at different distances from the image taking apparatus 100. In this case, the weighting factors are determined not only in accordance with the feature information of the faces but also in accordance with the degree of whether the focus and the exposure for each face are optimum. That is, the weighting factors calculated in accordance with the feature information of the faces are modified in accordance with the degree of whether the focus and the exposure for each face are optimum.

FIG. 9A illustrates an example of an image 702 including faces 619, 621, and 623 of human figures located at different distances as measured from the image taking apparatus 100. In the image 702, face areas 620, 622, and 624 of the respective faces 619, 621, and 623 are detected.

The degree of whether the focus of a face is optimum is detected, for example, such that an AF detection frame is set in a face area and high-frequency components of the image in the AF detection area are detected. The sharpness of focus is regarded as high with increasing integral of the high-frequency components. In the image 702 shown in FIG. 9A, if the face area 622 is highest in sharpness of focus, the weighting factor for the block including the face area 622 in the image 702 is increased.

FIG. 9B illustrates an example of an image 703 including faces 625, 627, and 629 of human figures located at different distances as measured from the image taking apparatus 100. In the image 703, face areas 626, 628, and 630 of the respective faces 625, 627, and 629 are detected.

The correctness of exposure for a face is detected, for example, by comparing the exposure for the face with a predetermined reference exposure level. The correctness of exposure is regarded as high if the exposure is close to the reference exposure level. In the image 703 shown in FIG. 9B, if the face area 626 is highest in exposure correctness, the weighting factor for the block including the face area 626 in the image 703 is increased.

Figure 10:
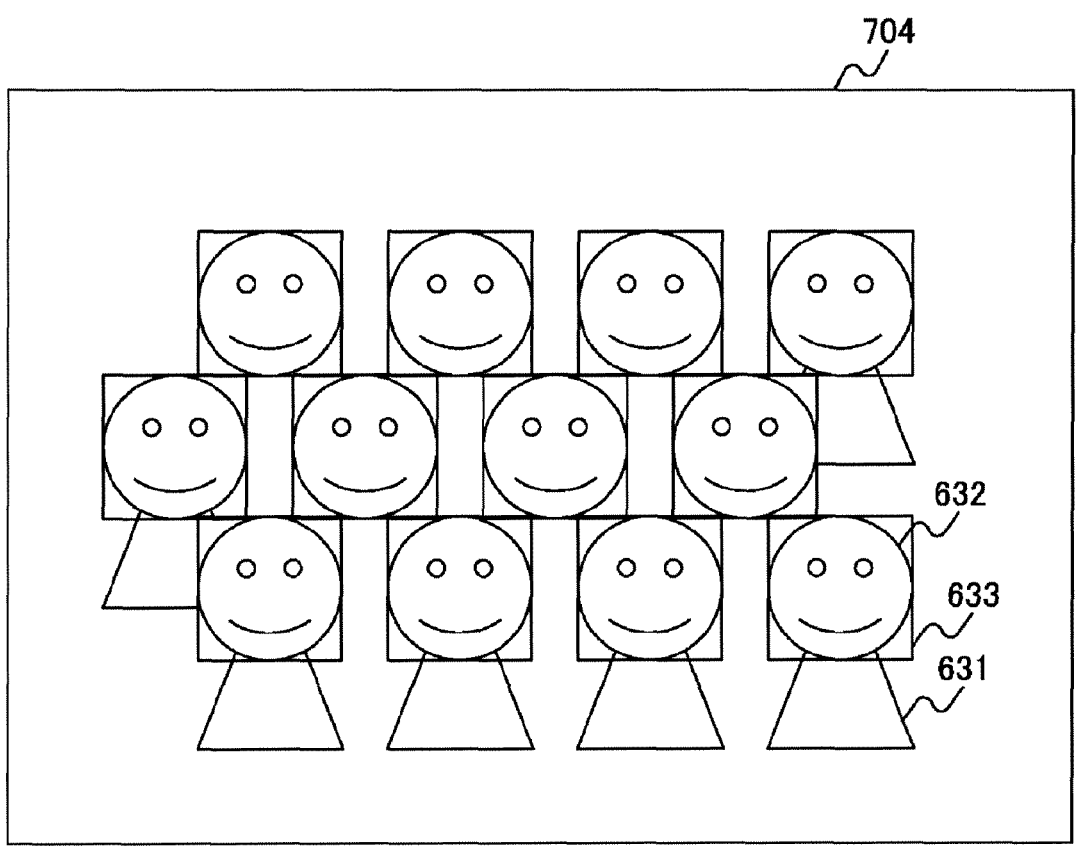
FIG. 10 illustrates an example of an image including faces of a plurality of human figures.

FIG. 10 illustrates an image 704 including a large number of human faces in the form of a so-called group photograph. In the image 704, a face area 633 of a face 632 of a human FIG. 631 and other face areas are all detected.

In a group photograph as with the image 704 shown in FIG. 10, there are many face areas with small face area sizes, and there is no face area with a large face area size. Furthermore, most faces in the image 704 face forward. Thus, when an image is determined as a group photograph, the weighting factors are equally assigned to the respective face areas, and the weighting factors are set to be rather small so that the weighting factors are optimized for the group photograph.

Figure 11:
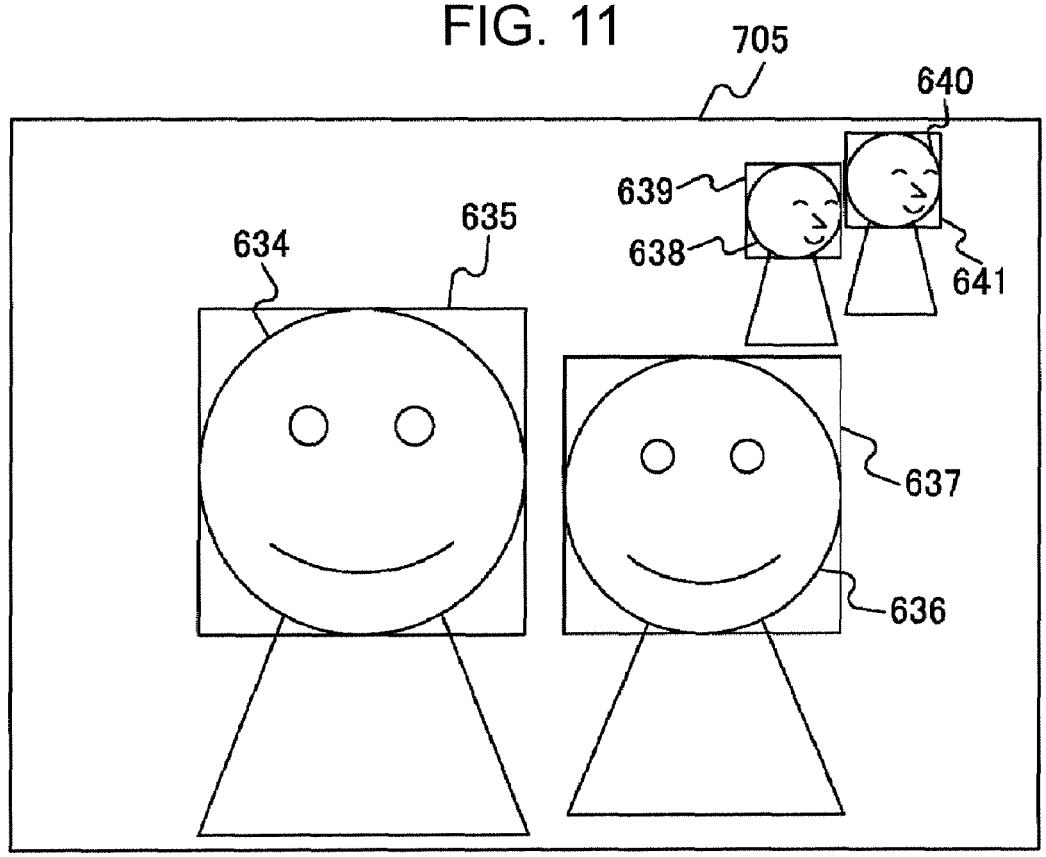
FIG. 11 illustrates an example of an image including faces of a plurality of human figures.

FIG. 11 illustrates an example of an image 705 including human FIGS. 634 and 636 which are main subjects and also including other human FIGS. 638 and 640 in the background.

In the example shown in FIG. 11 in which the image 705 includes main subjects of human FIGS. 634 and 636 and also includes other human FIGS. 638 and 640 in the background, the face areas of the main subjects of human FIGS. 634 and 636 are relatively great and are located close to the center of the image. On the other hand, face areas of other human FIGS. 638 and 640 in the background are relatively small and are located in a peripheral area of the image. The faces of human figures of the main subjects have a high probability of facing forward, and the faces of other human figures have a low probability of facing forward. If a human figure is determined to be in the background from the evaluation described above, a small weighting factor is assigned to the face area of this human figure. Thus, the weighting factor for the human figure in the background is corrected to a reasonable value.

Figure 12:
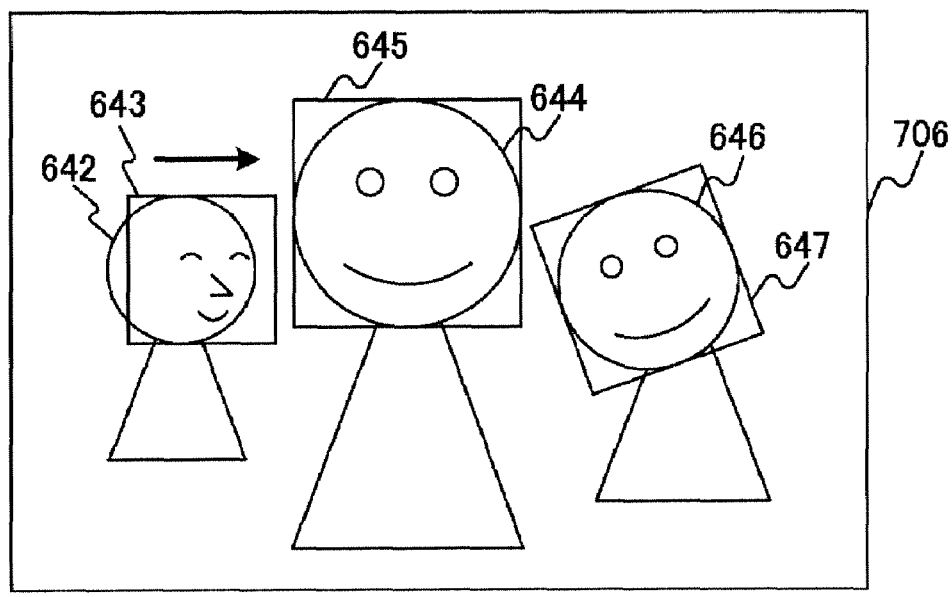
FIG. 12 illustrates an example of an image including faces of a plurality of human figures.

FIG. 12 illustrates an example of an image 706 including a plurality of human faces 642, 644, and 646.

As in the example shown in FIG. 12 in which the image 706 includes a plurality of face areas 643, 645, and 647, if a face area of a specific person (known person) is detected from the plurality of face areas, a greater weighting factor is assigned to this face area than to the other face areas so that the shake is most effectively suppressed for this specific person.

In the image 706 including the plurality of face areas 643, 645, and 647 shown in FIG. 12, for example, if the face area 643 is detected as being of a specific person, a greater weighting factor is assigned to this face area than to a face area having a greater face area size or a greater degree of facing forward.

The specific person is one of persons specified in advance by the user of the image taking apparatus 100. Feature data of specific persons are stored in advance as a specific person database in the image taking apparatus 100. The feature data includes data indicating an outline of a face and data indicating shapes, features, and locations of respective face parts (such as eyes, nose, eyebrows, mouth, ears, hair, mustache, glasses, etc.). The specific person data may be input to the image taking apparatus 100 from the outside. The feature data of each face area detected in the image is compared with the specific person data in the specified person database, and a determination is made from the correlation coefficient as to whether the face is of a specific person. The identification of a face image for a specific person may be performed, for example, based on a technique disclosed in Japanese Examined Patent Application Publication No. 6-7388.

As described above, when one or more faces are detected in an image, the degree of importance as a subject is expressed in a value for each face, and the weighting factor for each face is determined in accordance with the degree of importance.

The operation of the image taking apparatus 100 according to the present embodiment of the invention is described in further detail below.

Figure 13:
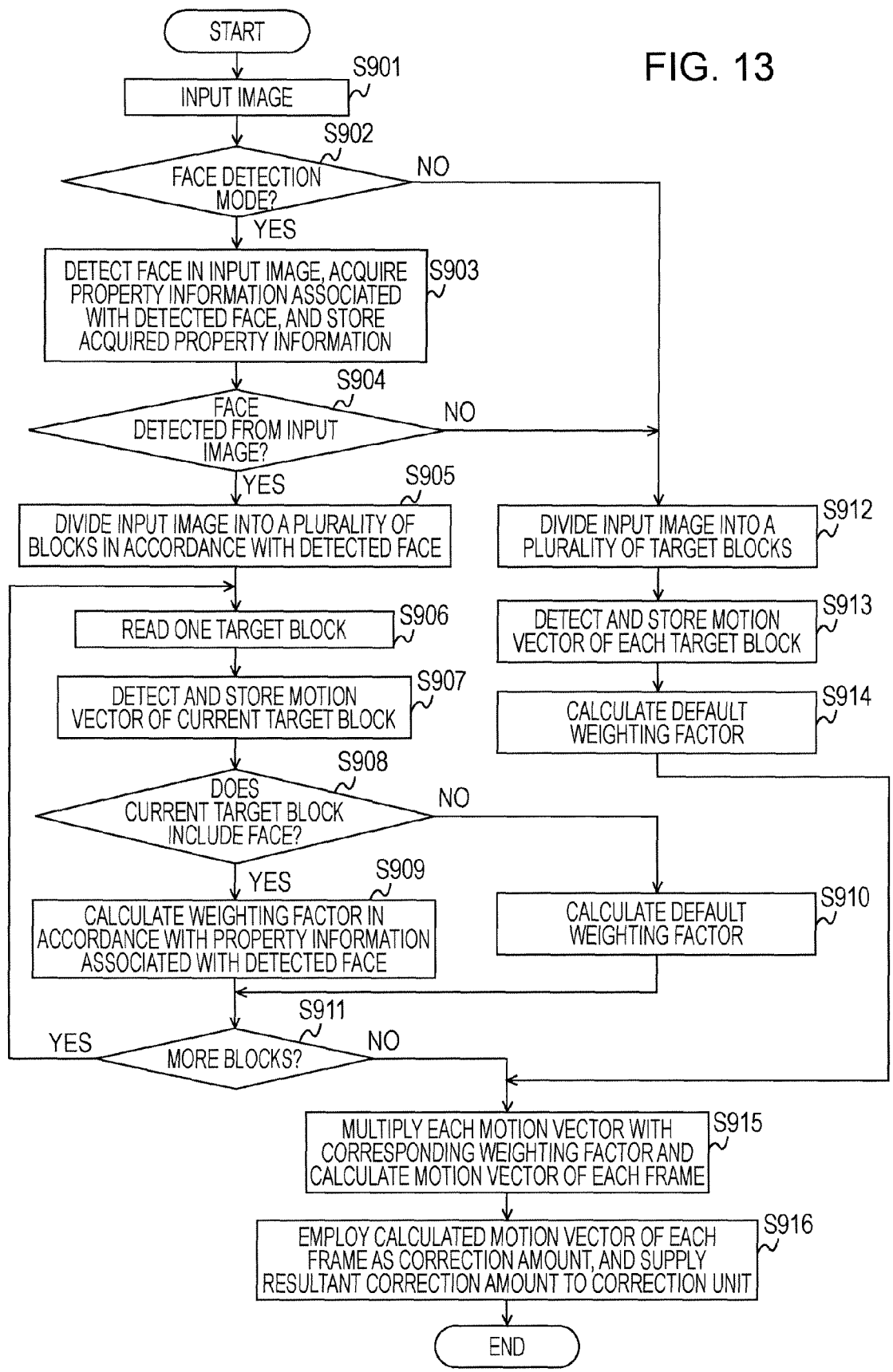
FIG. 13 is a flow chart illustrating a process of calculating a shake correction value performed in an image taking apparatus.

FIG. 13 is a flow chart illustrating a process of calculating a shake correction value performed by the image taking apparatus 100.

First, in the image taking apparatus 100, an image captured by the imaging unit 120 is input (step S901). If the image is input from the imaging unit 120, a determination is made at to whether the face detection mode is set in the on-state (step S902). If the face detection mode is in the off-state (step S902), it is not needed to perform the shake correction based on the face, and thus the process proceeds to step S912.

On the other hand, if the face detection mode is in the on-state (step S902), the face detector 300 detects a face in the input image and calculates various kinds of information associated with the detected face (step S903).

Next, it is determined whether a face has been detected in the input image (step S904). If no face is detected in the input image (step S904), it is not needed to perform the shake correction based on the face, and thus the process proceeds to step S912.

If a face has been detected in the input image (step S904), the input image is divided into a plurality of blocks such that each detected face is included in one of block (step S905). In the dividing of the input image, boundaries of blocks are determined so that the face is not divided into different blocks as shown in FIG. 6B. For example, the input image is divided into N blocks. In a case where a plurality of faces have been detected in the input image, the input image may be divided as follows. The detected faces are evaluated and one or more main faces are selected, and the image is divided such that each of the selected one or main faces is included in one of blocks.

Next, one target block is selected from the plurality of blocks (step S906). A motion vector of the selected target block is detected and stored (step S907). Next, it is determined whether the selected target block includes a face (step S908). If the selected target block includes a face (step S908), a weighting factor is calculated based on the various kinds of information associated with the face included in the target block (step S909). For example, when the target block includes a face, the weighting factor for this target block is calculated according to equation (1) (step S909). Thus, when the target block includes a face, a relatively great weighting factor is assigned to this target block so that the shake of the image is suppressed more effectively for the block including the face. In the calculation of weighting factors for blocks in step S909, the weighting factors may be determined according to one of methods described above with reference to FIGS. 9 to 12.

If the selected target block does not include a face (step S908), the weighting factor for the target block is calculated based on a predetermined value (step S910). More specifically, in the case where there are N blocks, and the predetermined value is given by $w_0$, the weighting factor for each block including no face is given by $w_n'=w_0=1/N$ (n=0 to N−1).

Next, it is determined whether the above-process has been performed for all blocks (step S911). If the process has not been performed for all blocks, (step S911), the processing flow returns to step S906 to repeat the process described above to calculate the weighting factor for a next target block (steps S906 to S910).

If the process has been performed for all blocks (step S911), the calculated weighting factors $w_0'$ to $w_{N-1}'$ for the respective blocks are normalized such that the total sum thereof becomes equal to 1. Next, the detected motion vectors of the respective blocks are weighted by the corresponding normalized weighting factors $w_0'$ to $w_{N-1}'$, thereby calculating the interframe motion vector of each block (step S915). The calculated interframe motion vector is supplies as a correction value to the shake correction unit 410 (step S916).

In the case where the face detection mode is in the on-state (step S902), or in the case where no face is detected in the input image (step S904), the input image is divided into a plurality of blocks (step S912). For example, the input image is divided into N blocks.

Subsequently, one target block is selected from the plurality of blocks and the motion vector of the selected target block is detected and stored (step S913). Next, the weighting factor for the target block is calculated based on the predetermined value (step S914). More specifically, in the case where there are N blocks, and the predetermined initial value is given by $w_0$, the weighting factor for each block including no face is given by $w_n'=w_0=1/N$. The process then proceeds to step S915. In step S915, the interframe motion vector of each block is calculated.

As described above, the motion vectors of the N blocks in each frame are weighted by factors determined depending on whether the block includes a face area, and one motion vector indicating the global motion of the image is calculated from the weighted motion vectors of the respective blocks. The resultant global motion vector is supplied to the shake correction unit 410. The shake correction unit 410 compensates for the shake in a direction opposite to the shake according to the received motion vector. As a result, the shake of the image is suppressed to a sufficiently low level, and the resultant high-quality image is output. In particular, the shake is suppressed more for the face of a human figure than for a background, and thus the resultant image is clear for a main subject.

Next, referring to FIG. 14, the shake correction unit 410 adapted to correct the shake of an image in accordance with shake correction value calculated by the correction value calculation unit 440 is described in further detail below.

As described above, the shake correction unit 410 includes the electronic shake correction mechanism and the optical shake correction mechanism. The electronic shake correction mechanism is a mechanism of correcting the shake by shifting the read address in the operation of reading data from the image sensor 122 or shifting the write address in the operation of writing data into the image storage unit 140. The optical shake correction mechanism is mechanism of correcting the shake by moving or tilting the shake correction lens, or by deforming or tilting the shake correction prism or by moving the image sensor 122.

The electronic shake correction mechanism or the optical shake correction mechanism corrects the shake of the image in accordance with the global motion vector of the image calculated from a plurality of local motion vectors. The electronic shake correction mechanism is also capable of locally correcting the shake of the image in accordance with a plurality of local motion vectors detected for one image. The shake correction unit 410 includes at least the electronic shake correction mechanism.

Figure 14:
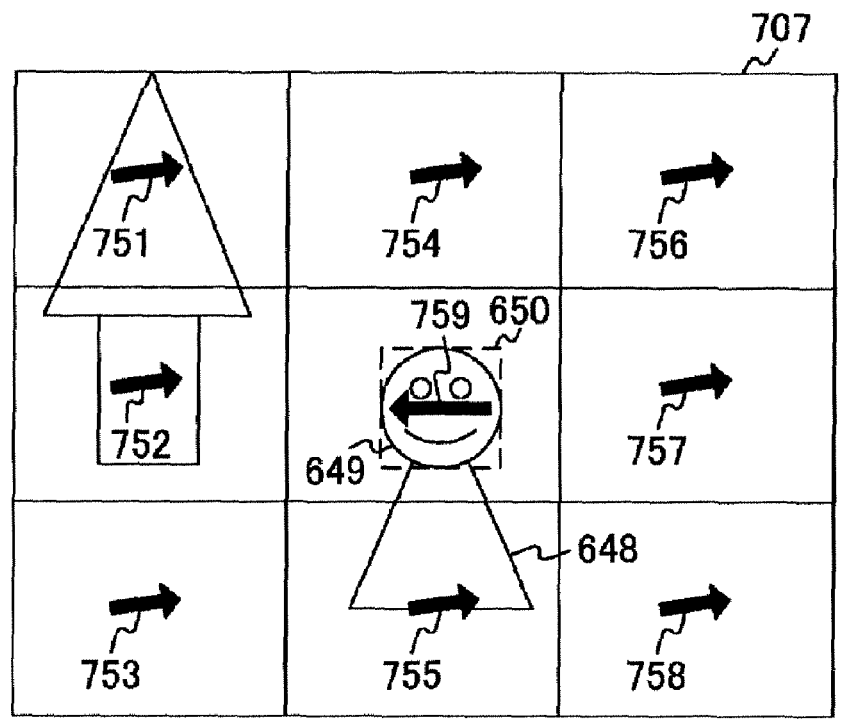
FIG. 14 illustrates motion vectors calculated for respective nine blocks of an image including a human figure.

FIG. 14 illustrates examples of motion vectors 751 to 759 calculated for respective nine blocks of an image 707 including a human FIG. 648. In the image 707, motion vectors 751 to 758 are detected for blocks in the background of the image 707, and thus these are equal to each other and indicate the global motion of the image. On the other hand, a motion vector 759 is detected for a block including a face area 650 of a face 649 of a human FIG. 648 which is a main subject, and thus the motion vector 759 indicates a local motion and which can be different from the motion vectors 751 to 758. That is, the motion vector 759 indicates the motion of the face, while the motion vectors 751 to 758 indicate the motion of the background.

For the image 707 shown in FIG. 14, the electronic shake correction mechanism of the shake correction unit 410 makes the same local correction on the blocks corresponding to the motion vectors 751 to 758 because the motion vectors 751 to 758 are equal to each other. However, the electronic shake correction mechanism makes a different local correction on the block corresponding to the motion vector 759 in accordance with the motion vector 759 different from the motion vectors 751 to 758.

As a result, the shake is effectively suppressed for the face area of the human figure which is the main subject, and a sharp image can be obtained. Thus, it is possible to suppress the shake of faces and nearby areas to a sufficiently low level so that a resultant image has high quality for main subjects without being influenced by the shake of the background or objects in the background. Note that the technique according to the present embodiment of the invention is applicable not only to particular shake correction mechanisms such as the electrical correction mechanism or the optical correction mechanism, but can be applicable to a wide variety of shake correction mechanisms.

Next, a method of correcting a shake of an image on the basis of a shake component (shake magnitude) 201 of the image taking apparatus 100 itself detected by the vibration sensor 200 is described below with reference to FIG. 15.

Figure 15:
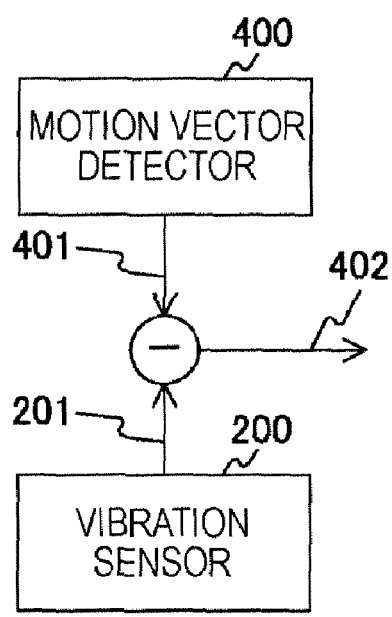
FIG. 15 illustrates an example of a method of extracting a shake component of a subject from a shake component of an image taking apparatus and a shake component of various parts of an image.

FIG. 15 illustrates an example of a method of detecting a shake component of a subject on the basis of a shake component (shake magnitude) 201 of the image taking apparatus 100 detected by the vibration sensor 200 and a shake component (shake magnitude) 401 of each block of an image detected by the motion vector detector 400.

As shown in FIG. 15, the shake component 402 of the moving subject can be obtained by subtracting the shake component 201 of the image taking apparatus 100 detected by the vibration sensor 200 from the shake component 401 of each block of the image detected by the motion vector detector 400. In other words, the shake component of the moving subject is obtained by removing the shake component of the image taking apparatus 100 due to the hand shake or the like from the shake component of each block of the image. On the basis of the shake component calculated for each block, the shake component of a face area can be calculated.

Figure 16:
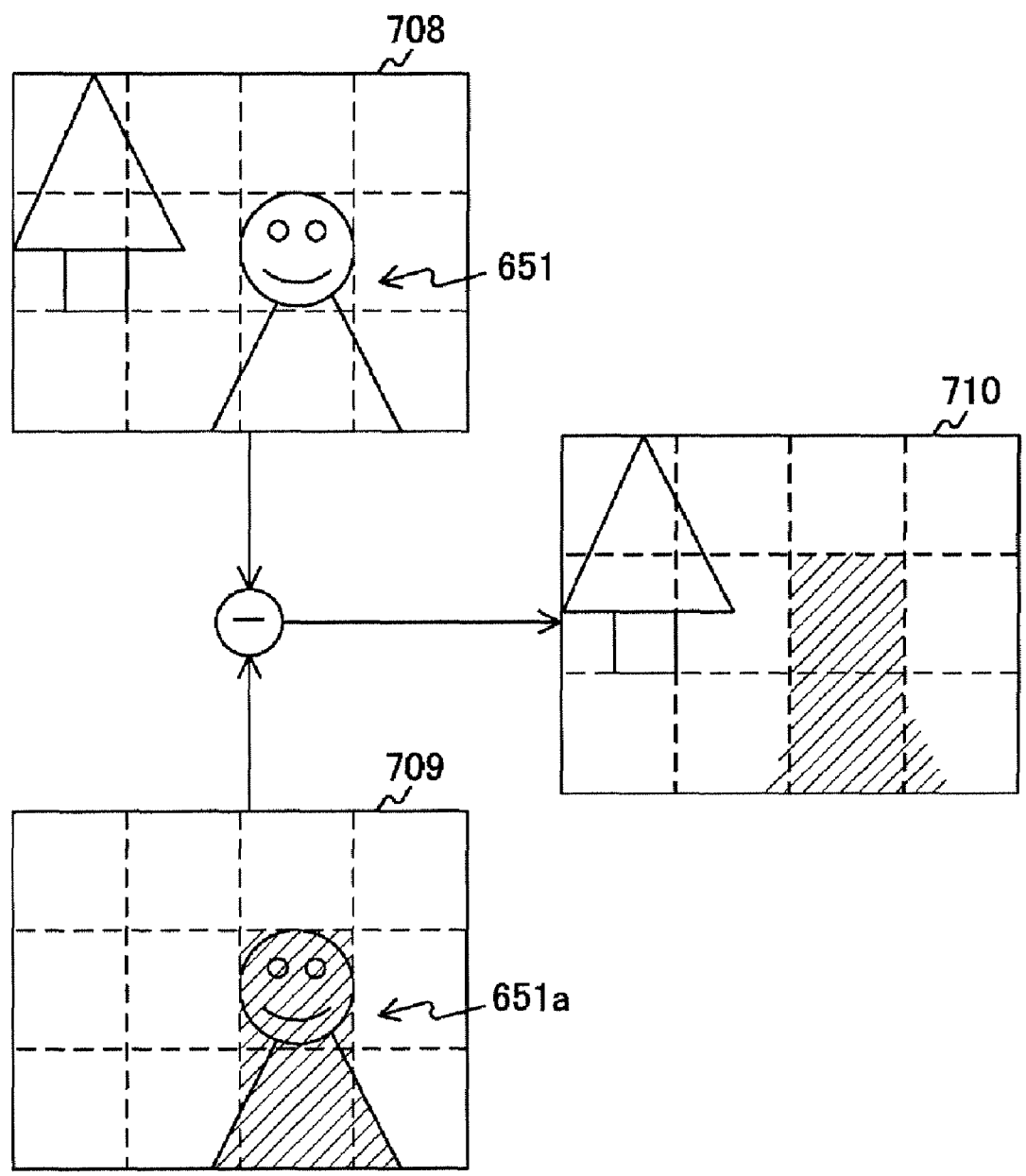
FIG. 16 Illustrates an example of a method of extracting a shake component of a background of an image from motion vectors of various parts of the image and a motion vector a human figure in the image.

FIG. 16 illustrates an example of a method of detecting a shake component of a background other than a moving subject in an image 708 on the basis of motion vectors detected for respective blocks of the image 708 detected by the motion vector detector 400 and a motion vector detected for a human FIG. 651 which is the moving subject in the image 708 detected by the motion vector detector 400.

As shown in FIG. 16, the motion vector exactly indicating only the motion component of the background including no motion component of the moving subject can be obtained by subtracting the motion vector of the area 651*a* regarded as including a face area and a body area of the human FIG. 651, which is the moving subject, from the motion vectors of respective blocks of the image 708.

As described above, use of the vibration sensor 200 makes it possible to detect a shake component (of the image taking apparatus 100) which is not dependent on the image processing. It also becomes possible to calculate the shake correction value of a moving subject by subtracting the shake component detected by the vibration sensor 200 from motion vectors detected by the motion vector detector 400 for respective blocks of an image and weighting the resultant values. Thus, it is possible to calculate the shake correction value from the motion vectors detected by the motion vector detector 400 and the shake component detected by the vibration sensor 200.

Next, a method of correcting a shake of various parts of an image, on the basis of a face area detected by the face detector 300 and motion vectors detected by the motion vector detector 400 is described below. In the examples described above, when the motion vector detector 400 detects motion vectors, if a face is detected by the face detector 300, a captured image is divided into a plurality of areas such that the detected face is completely included in one of areas, and motion vectors are determined for the respective areas.

In contrast, in the method described below, when the motion vector detector 400 detects motion vectors, the captured image is divided into a plurality of areas regardless of whether the image includes a face, and motion vectors of the respective areas are determined. More specifically, the motion vectors detected for the respective areas of the image are separated into shake vectors (global vectors) of the background and shake vectors (local vectors) of moving subjects including a face, and detection and correction of the shake are performed based on the separated shake vectors.

Figure 17:
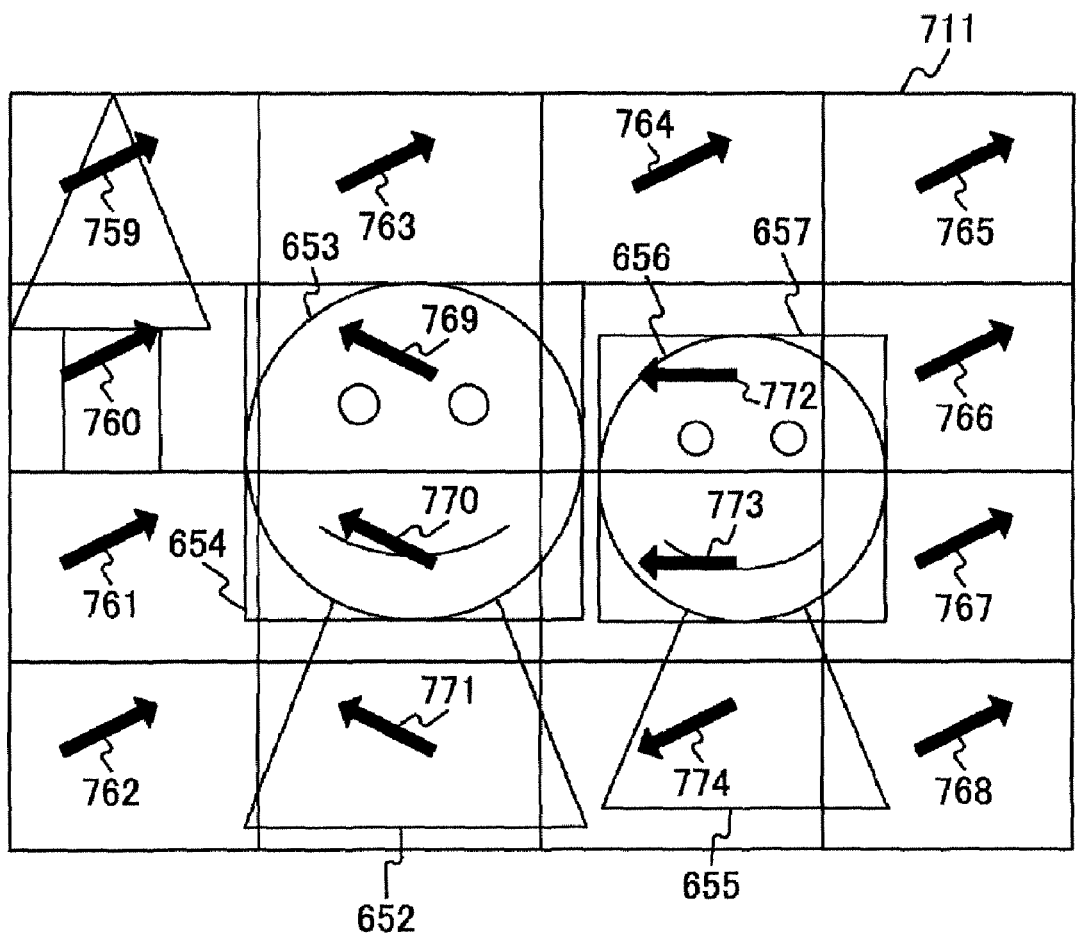
FIG. 17 illustrates motion vectors calculated for respective sixteen blocks of an image including two human figures.

FIG. 17 illustrates examples of motion vectors 759 to 774 calculated for 16 blocks of an image 711 including a human FIG. 652 and a human FIG. 655. In the image 711 shown in FIG. 17, motion vectors 759 to 768 are detected for blocks in the background of the image 711 and thus these motion vectors 759 to 768 are identical to each other and indicate the global motion of the image 711. Motion vectors 769 and 770 are detected for blocks partially including a face area 654 of a face 653 of the human FIG. 652 which is one of the moving subjects and thus these vectors indicate the local motion of the face of the human FIG. 652. A motion vector 771 is detected for a block partially including a body of the human FIG. 652 and thus this motion vector 771 indicates the local motion of the body of the human FIG. 652. Motion vectors 772 and 773 are detected for blocks partially including a face area 657 of a face 656 of the human FIG. 655 which is one of the moving subjects and thus these vectors indicate the local motion of the face of the human FIG. 655. A motion vector 774 is detected for a block partially including a body of the human FIG. 655 and thus this motion vector 774 indicates the local motion of the body of the human FIG. 655.

The electronic shake correction mechanism of the shake correction unit 410 is capable of locally correcting a shake on the basis of a plurality of motion vectors detected for a single image.

In the image 711 shown in FIG. 17, the electronic shake correction mechanism of the shake correction unit 410 makes the same local correction on the blocks corresponding to the motion vectors 759 to 768 because the motion vectors 759 to 768 are equal to each other. On the other hand, the electronic shake correction mechanism of the shake correction unit 410 makes local correction on blocks corresponding to the vectors 769 to 774 in accordance with the respective motion vectors 769 to 774. That is, when the face 656 or the body of the human FIG. 655 is moving, the shake correction is performed in accordance with the motion.

As described above, a determination is made for each block as to whether the block includes at least a part of a face, and data indicating the determination result for each block is stored. The average motion vector for a face area and the average motion vector for the background area are calculated, and the calculated average motion vectors are stored. The shake correction is then performed in accordance with the calculated average motion vectors. A moving subject area such as a body, arms, legs, etc. of a human figure may be regarded as a part of a face area, and the average of motion vectors of the face area including these parts may be calculated, or average motion vectors may be calculated separately for respective parts of the moving subject. As a result, the shake is effectively suppressed for the face area of the human figure which is the main subject, and a sharp image can be obtained. Thus, it is possible to suppress the shake of faces and nearby areas to a sufficiently low level so that a resultant image has high quality for main subjects without being influenced by the shake of the background or objects in the background.

Next, referring to FIG. 18, a process of correcting shakes such as those shown in FIG. 17 is described below.

Figure 18:
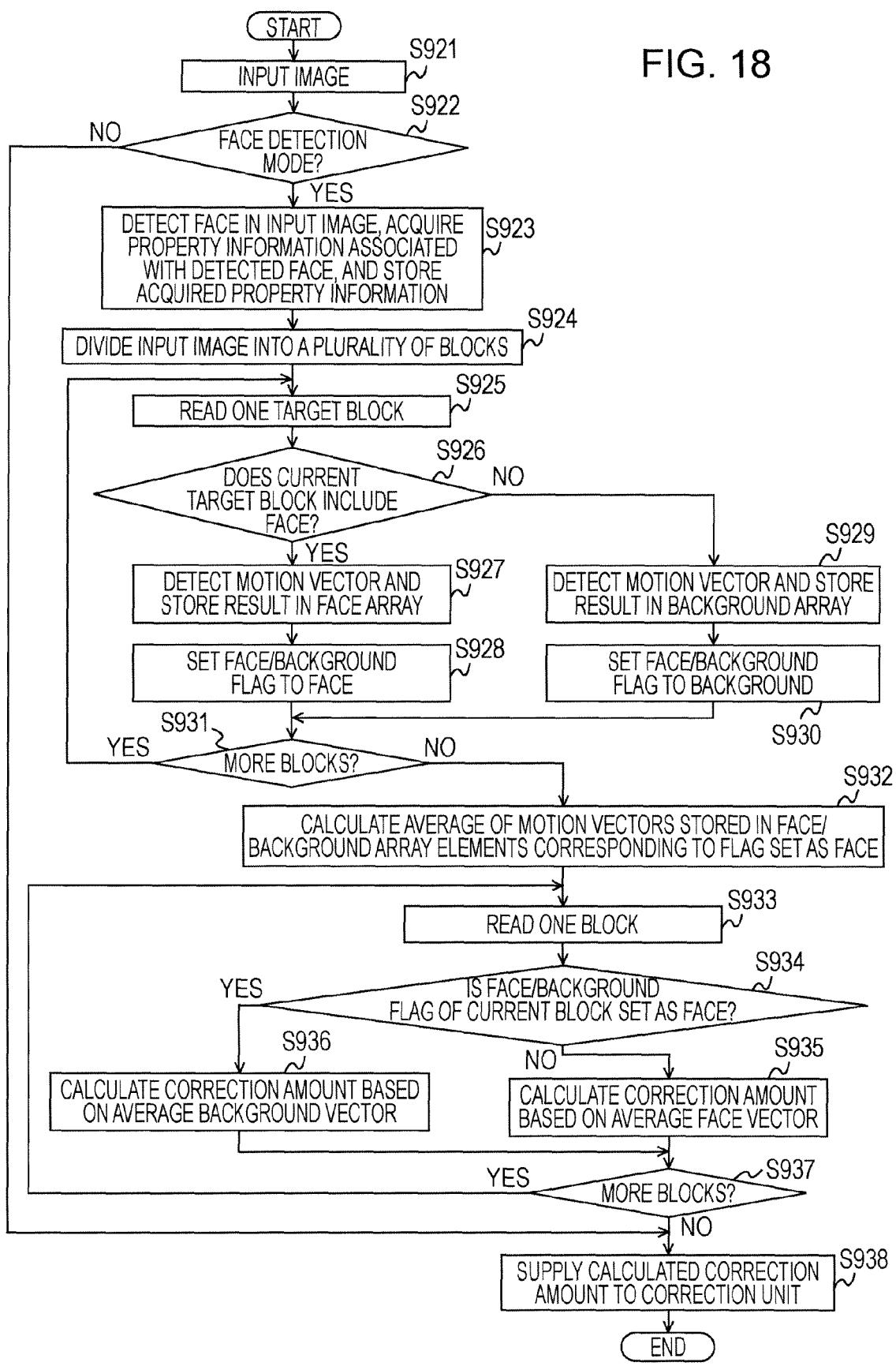
FIG. 18 is a flow chart illustrating a process of calculating a shake correction value performed in an image taking apparatus.

FIG. 18 is a flow chart illustrating the process of calculating shake correction values performed by the image taking apparatus 100.

First, in the image taking apparatus 100, an image captured by the imaging unit 120 is input (step S921). If the image is input from the imaging unit 120, a determination is made at to whether the face detection mode is set in the on-state (step S922). In a case where the face detection mode is in the off-state (step S922), it is not needed to perform the shake correction based on the face. Thus, in this case, the shake correction value is calculated in the normal mode without taking into account a face, and the calculated shake correction value is supplied to the shake correction unit 410 (step 938).

On the other hand, if the face detection mode is in the on-state (step S922), the face detector 300 detects a face in the input image and calculates various kinds of information associated with the detected face (step S923).

Thereafter, the input image is divided into a plurality of areas (blocks) (step S924). For example, the input image is divided into N blocks.

One block is selected from the plurality of blocks (step S925), and it is determined whether the selected block includes a face (step S926). If the selected block includes a face (step S926), a motion vector of the selected block is detected, and the detected motion vector is stored in an array adapted to store motion vectors of faces (hereinafter, referred to simply as a face-vector array) (step S927). A face/background flag associated with the current block is set to "face" (step S928). In a case where a plurality of faces have been detected, a motion vector of each face is stored in each face-vector array, and the face/background flag associated with each block including a face is set to "face".

If the selected block does not include a face (step S926), a motion vector of the selected block is detected, and the detected motion vector is stored in an array for storing motion vectors of the background (hereinafter, referred to simply as a background-vector array) (step S929). The face/background flag associated with the current block is set to "background" (step S930).

Next, it is determined whether the above-process has been performed for all blocks (step S931). If the process has not been performed for all blocks, (step S931), the process returns to step S925 to repeat the process described above to detect the motion vector of a next block (steps S925 to S930).

If the process has been performed for all blocks (step S931), the average motion vector of the face area is calculated from the motion vectors stored in the face-vector array, and the average motion vector of the background area is calculated from the motion vectors stored in the background-vector array (step S932). In a case where a plurality of faces have been detected, the average motion vector is calculated separately for each face area.

One block is selected from the plurality of blocks (step S933), and it is determined whether the face/background flag corresponding to the selected block is set to "face" (step S934). If the face/background flag corresponding to the selected block is set to "face" (step S934), the shake correction value for the selected block is calculated from the average motion vector of the face area (step S935). On the other hand, if the face/background flag corresponding to the selected block is set to "background" (step S934), the shake correction value for the selected block is calculated from the average motion vector of the background area (step S936).

Thereafter, it is determined whether the above-process has been performed for all blocks (step S937). If the process has not been performed for all blocks, (step S937), the process returns to step S933 to repeat the process described above to calculate the correction value for a next block (steps S933 to S936).

If the process has been performed for all blocks (step S937), the calculated correction value for each block is supplied to the shake correction unit 410 (step S938).

As described above, the motion vector is calculated for each of all N blocks, and the average motion vectors of the face area and the background area are calculated from the motion vectors of the N blocks. Furthermore, based on the calculated average motion vectors, the correction values for the respective blocks are calculated depending on whether each block is a face area or a background area. The calculated correction values are supplied to the shake correction unit 410. The shake correction unit 410 compensates for the shake in a direction opposite to the shake direction to obtain a high-quality image whose shake is suppressed to a sufficiently low level. In particular, the shake is suppressed more effectively for the face of a human figure than for a background, and thus the resultant image is clear for a main subject.

Next, the correction value for the moving subject area including the face is calculated based on the local motion vector such that the location of the subject is corrected toward the center of the image. That is, the shake of the image of the human figure is corrected such that the correction causes the location of the human figure to be moved toward the center of the image.

Figure 19A:
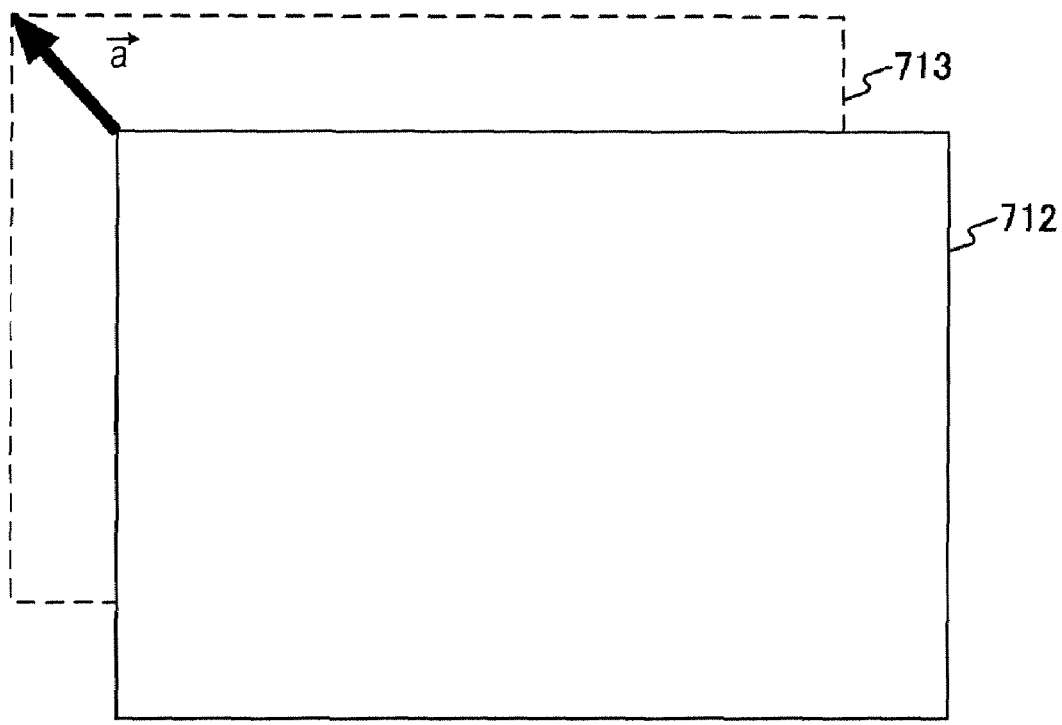
FIG. 19 illustrates a manner in which the location of a moving subject area including a face area is corrected toward the center of an image.
Figure 19B:
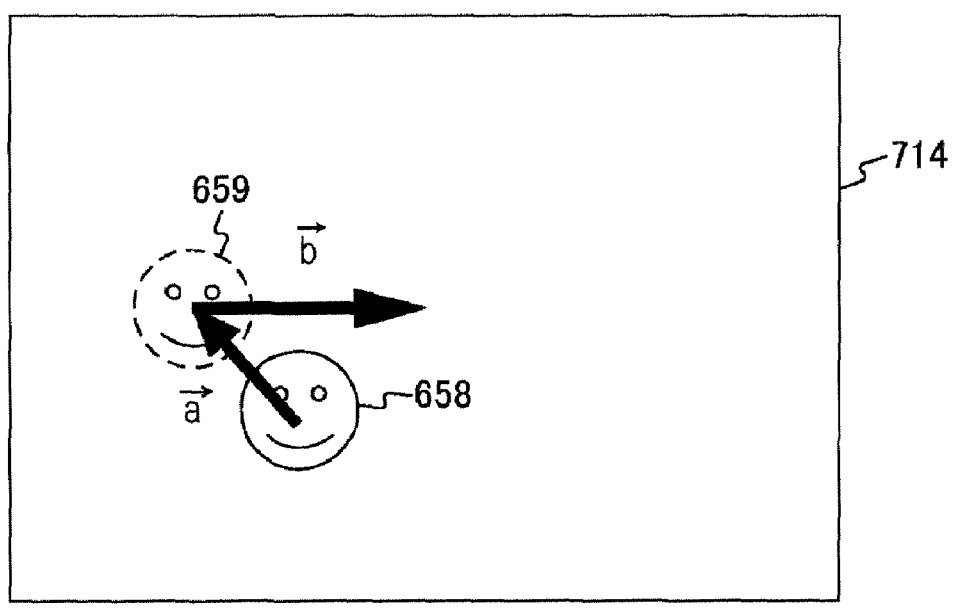

FIGS. 19A and 19B illustrate a manner in which the location of a moving subject area including a face area is corrected toward the center of an image.

As shown in FIG. 19A, if the global correction value (correction vector) calculated for the image 712 is given by a vector a, the location of the face area in the image 712 is corrected by the vector a.

In a case where, as shown in FIG. 19B, a face 658 of a human figure is not located close to the center of an image 714, not only the correction of the shake is made, but also the face 658 of the human figure may be moved to a location close to the center of the image 714.

For example, when the calculated global correction value for the image 714 is given by the vector a, a vector b for moving the face 658 to the center of the image is determined and weighted by a weighting factor $w_6$. The local correction for the face is made in accordance with the sum of the vector a and the weighted vector b according to equation (2):

$$\text{correction value} = \text{vector } a + w_6 \times \text{vector } b \qquad (2)$$

where the vector b is determined by the difference between the coordinates of the face and the coordinates of the center of the image, and the weighting factor $w_6$ is set to a value in the range from 0.1 to 0.5.

Thus, as described above, in addition to the correction of the shake of the face area, framing correction is made.

As described above, the face area and an area of a human figure predicted from the face area are corrected according to local motion vectors, while the background area is corrected in accordance with the global motion vector, and thus the shake is corrected optimally depending on the areas.

The local correction vector for the face area and the moving subject area predicted from the face area is calculated such that the application of the correction vector causes the face area and the subject area to be moved toward the center of the image, that is, the shake correction is performed such that the human figure is moved to the center of the image, thereby achieving further desirable framing.

In the embodiments described above, motion vectors are detected by the image processing based on the block matching method. However, the method of detecting motion vectors is not limited to this method, but motion vectors may be detected by other methods. An example of other method is described below.

FIG. 20 illustrates an example of a method of detecting motion vectors from an image on the basis of a face area detected by the face detector 300.

In this method, as shown in FIG. 20, the motion vector is detected on the basis of a face area detected in a previous frame (image 715) of a motion image and a face area detected in a current frame (image 716) immediately following the previous frame. Note that the current frame (image 716) is a frame appearing when a predetermined period of time t has elapsed from the previous frame (image 715). To detect various shake components, both the vibration sensor 200 and a mechanism of detecting motion vectors based on the face area detected by the face detector 300 are used.

Figure 20A:
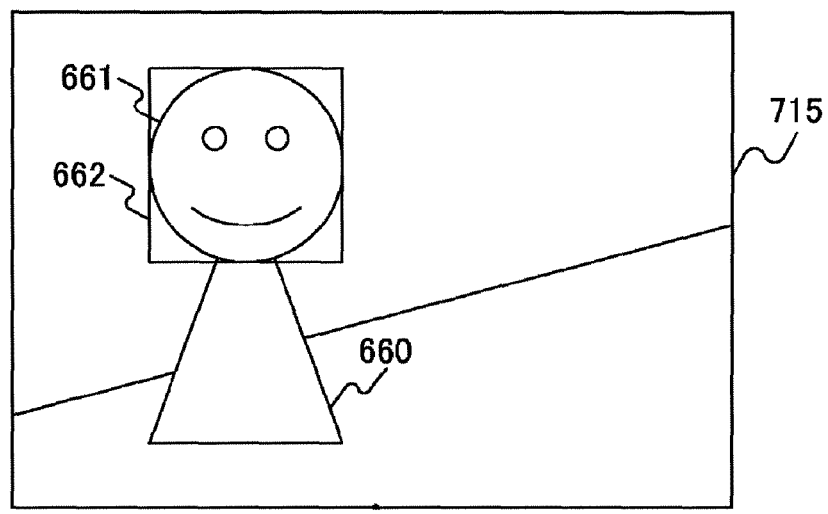
FIGS. 20A and 20B illustrate an example of a method of detecting a motion vector from an image on the basis of a face area detected by a face detector.

FIG. 20A illustrates an example of a previous frame of image (image 715) including a human FIG. 660, a face 661 of the human FIG. 660, and a face area 662 of the face 661 detected by the face detector 300.

Figure 20B:
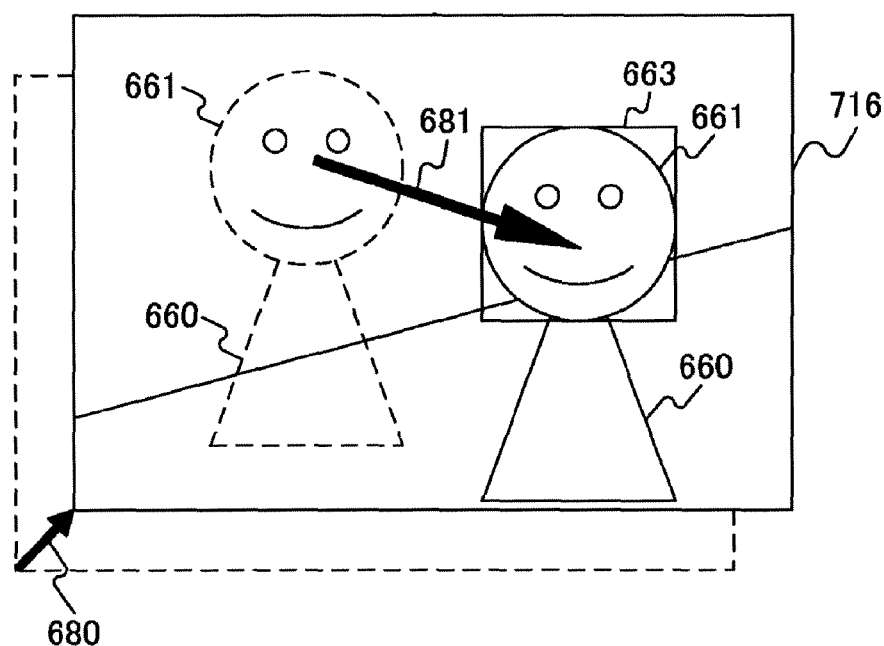

FIG. 20B illustrates an example of a current frame of image (image 716) including the human FIG. 660, the face 661 of the human FIG. 660, and a face area 663 of the face 661 detected by the face detector 300. FIG. 20B also illustrates a hand shake vector 680 detected by the vibration sensor 200 and a motion vector 681 detected based on the face area detected by the face detector 300. In the current frame shown in FIG. 20B, the face is at a location indicated by the sum of the hand shake vector 681 and the motion vector 681 detected based on the face area.

When one or more face areas are detected in the current frame of image (image 716) by the face detector 300, the total evaluation value $E_n$ for each face area is determined based on the coordinates of the face area, the value indicating the likelihood of being a face, the angle of the face, etc. For example, the total evaluation value $E_n$ is calculated according to equation (3):

$$E_n = w_1 \times \text{face area size} + w_2 \times \text{coordinate of face area} + \qquad (3)$$
$$w_3 \times \text{value indicating the likelihood of being a face} +$$
$$w_4 \times \text{degree of facing forward} + w_5 \times \text{degree of tilt of the face}$$

where $w_1$ to $w_5$ are weighting factors for respective evaluation values.

Note that the total evaluation value $E_n$ is not limited to that calculated according to equation (3), but the total evaluation value $E_n$ may be determined differently. For example, the total evaluation value $E_n$ may include one or more additional evaluation factors or may include only one or more evaluation values included in equation (3).

In the previous frame (image 715), a search area with a size greater than the size of the face area is set so that the face area detected in the current frame (image 716) is included in the search area. A face having an evaluation value close to the evaluation value of the face area detected by the face detector 300 is searched for within the search area. If faces which are similar in face evaluation value to each other are found in both the previous frame and the current frame, the vector between these two faces is employed as the motion vector (face area vector).

Using the above-described face area vector and the image-independent hand shake vector detected by the vibration sensor 200, the correction vector is determined in accordance with equation (4) described below.

$$\text{correction vector} = \text{correction vector for hand shake component} + \qquad (4)$$
$$w_7 \times \text{face area motion vector} +$$
$$w_8 \times \text{vector from face to center of image}$$

where $w_7$ and $w_8$ are weighting factors. Note that $w_8$ may be equal to $w_6$.

In a case where a plurality of faces are detected, a single correction vector for each frame may be determined from correction vectors calculated for the respective faces according to equation (4), or local corrections may be made separately for the respective face areas in accordance with the respective correction vectors.

Next, a process of correcting the shake in accordance with the motion vector detected based on the face area is described below referring to FIG. 21.

Figure 21:
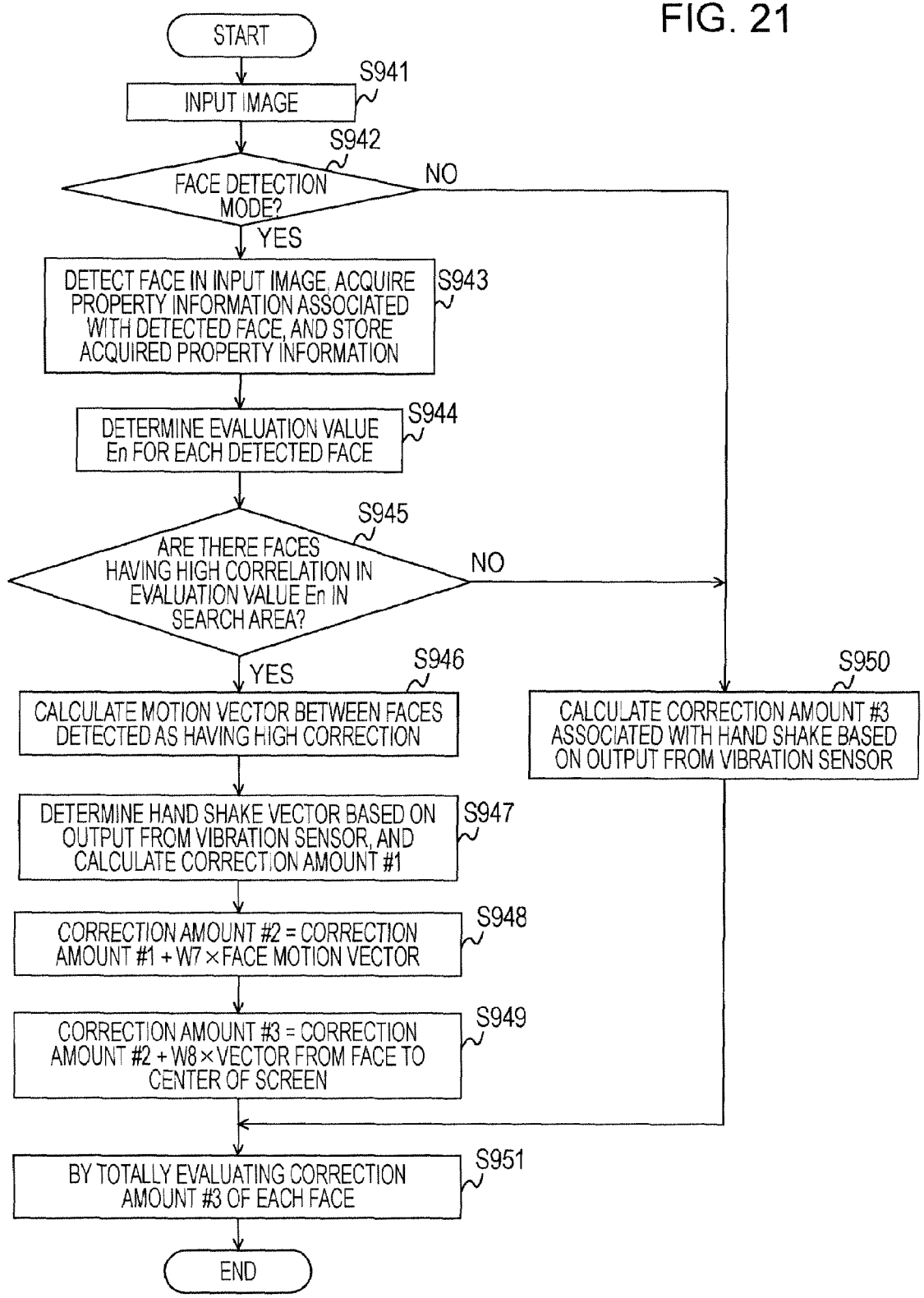
FIG. 21 is a flow chart illustrating a process of calculating a shake correction value performed in an image taking apparatus.

FIG. 21 is a flow chart illustrating the process of calculating shake correction value performed by the image taking apparatus 100.

First, in the image taking apparatus 100, an image captured by the imaging unit 120 is input (step S941). If the image is input from the imaging unit 120, a determination is made at to whether the face detection mode is set in the on-state (step S942). If the face detection mode is in the off-state (step S942), the correction value #3 is calculated based on the hand shake vector detected by the vibration sensor 200 (step S950). The process then proceeds to step S951.

On the other hand, if the face detection mode is in the on-state (step S942), the face detector 300 detects a face in the input image and calculates various kinds of information associated with the detected face (step S943).

Next, the total evaluation value $E_n$ for each face area is determined based on the feature information of each face detected by the face detector 300. For example, the total evaluation value $E_n$ is calculated according to equation (3) (step S944). Next, a search area with a size greater than the size of the face area is set in a previous frame of a motion image so that the face area detected in the current frame is included in the search area, and a determination is made as to whether a face having an evaluation value close to the evaluation value of the face area detected by the face detector 300 is preset within the search area (step S945). If a face having a similar face evaluation value is not detected (step S945), it is determined that the motion vector based on the face area cannot be detected, and the process proceeds to step S950.

On the other hand, if a face having a similar face evaluation value is detected in the search area (step S945), the vector between the two similar face areas respectively detected in the previous frame and the current frame is employed as the motion vector (face motion vector) (step S946).

Next, the correction value #1 is calculated based on the hand shake vector detected by the vibration sensor 200 (step S947), and a correction value #2 is calculated from the correction value #1 and the face area motion vector according to equation (5) (step S948).

$$\text{correction value \#2} = \text{correction value \#1} + w_7 \times \text{face area motion vector} \quad (5)$$

Next, a correction value #3 is calculated using the correction value #2 according to equation (6) (step S949).

$$\text{correction value \#3} = \text{correction value \#2} + w_8 \times \text{vector from face to center of image} \quad (6)$$

Note that in steps S948 and S949, the value of equation (4) described above is determined. Also note that $W_7$ and $w_8$ are weighting factors which are the same as those described above.

Next, the global shake correction value of the image is calculated from the correction value #3 calculated in step S949 or S959, and the calculated shake correction value is supplied to the shake correction unit 410 (step S951).

Thus, in addition to the correction of the shake for the face area, it is also possible to make the framing correction such that the face is moved to the center of the image. Therefore, it is possible to obtain a high-quality output image in which the shake of the face area is suppressed and the framing is well controlled. In the above process, equations or values are merely examples, and other equations or values may be used.

According to the embodiments described above, it is possible to obtain a sharp image whose shake is suppressed to a very low level. In particular, it is possible to suppress the shake more effectively for faces and nearby areas, and thus it is possible to achieve high quality for main subjects in the image.

Furthermore, it is possible to achieve high quality for main subjects without being influenced by the shake of the background or objects in the background.

The shake correction value can be calculated more properly by determining the weighting factors based on the coordinate of the face area, the location of the face in the image, the face area size, the likelihood of being a face, the degree of facing forward, the degree of tilt, etc.

The shake correction may be performed globally for the image according to a single vector or locally for various parts of the image in accordance with a plurality of vectors. Thus, it is possible to make a correction optimally depending on the subject of the image.

When a local shake is corrected, it is possible to move the location of a face area toward the center of an image so that a human figure which is main subject of the image is located at a proper position.

In a case where the image taking apparatus is configured to include only an electronic shake detection unit and an electronic shake correction unit as the shake detection unit and the shake correction unit, it is possible to reduce the size, the cost, and power consumption of the image taking apparatus.

When it is detected that an image includes many human figures located in the form of a group picture, the weighting factors are optimized for the group picture so that a high-quality group picture can be obtained.

When one or more human figures are present in the background, these human figures in the background are distinguished from a human figure which is a main subject, and the influence of human figures in the background is suppressed. Thus, it is possible to suppress the shake most effectively for the main human figure.

In a case where a plurality of faces are detected in an image, a face for which focus and exposure are set most correctly is detected, and the shake is corrected most effectively for the detected face so that the image has high quality for this face.

When a face of a specific person is detected in an image, a large weighting factor is assigned to this human figure so that the shake is most effectively suppressed for this specific person.

It is possible to detect a global shake component by subtracting the shake component of a face area from a detected motion vector.

Instead of detecting the motion vector using the block matching method, the motion vector may be determined by detecting a vector indicating movement of a face area, and the local shake correction may be performed in a manner optimized depending on the face area. When the image includes a plurality of faces, it is possible to correct the shake separately for the respective faces optimally depending on the face.

Thus, as described above, the present invention makes it possible to correct the shake of the image properly depending on the image.

The embodiments of the present invention may be applied, for example, to an image processing apparatus implemented, for example, on a personal computer adapted to input an image from a digital still camera or the like and display the input image on a display.

Note that the embodiments of the present invention have been described above only by way of examples but not of limitation. Features of the present invention are implemented by specific elements in the embodiments described above. Note that the features are not limited to those specific elements described in the embodiments, but various modifications are possible.

For example, the imaging means is implemented by the imaging unit 120 in the embodiments described above.

The face detection means is implemented, for example, by the face detector 300 in the embodiments described above.

The motion detection means is implemented, for example, by the motion vector detector 400 in the embodiments described above.

The shake correction means is implemented, for example, by the shake correction unit 410 in the embodiments described above.

The correction value calculation means is implemented, for example, by the correction value calculation unit 440 in the embodiments described above.

The vibration detection means is implemented, for example, by the vibration sensor 200 in the embodiments described above.

The camera control value detection means is implemented, for example, by the controller 110 in the embodiments described above.

The setting means is implemented, for example, by the selection unit 162 in the embodiments described above.

The specific person storage means is implemented, for example, by the memory 210, and the specific person identification means is implemented, for example, by the controller 110 in the embodiments described above.

The image input means is implemented, for example, by the signal processing unit 130.

The image input step is implemented, for example, by step S901 in the embodiments described above. The face detection step is implemented, for example, by step S903 in the embodiments described above. The moving distance detection step is implemented, for example, by step S907 in the embodiments described above. The shake correction step is implemented, for example, by step S916 in the embodiments described above.

The sequence of processing steps described in the embodiments may be regarded as a method including a sequence of steps, or the sequence of steps may be implemented in the form of computer program or in the form of a storage medium in which the program is stored.

It should be understood by those skilled in the art that various modifications, combinations, sub-combinations and alterations may occur depending on design requirements and other factors insofar as they are within the scope of the appended claims or the equivalents thereof.

What is claimed is:

1. An image taking apparatus comprising:
    an imaging sensing unit configured to sense an image of a subject;
    a face detection unit configured to detect a face in the image sensed by the imaging unit;
    a motion detection unit configured to detect, via a processor, an amount of face motion indicating an amount of shake of an area of the face detected, by the face detection unit, in the image sensed by the imaging unit and also detecting an average amount of background motion indicating an amount of shake of an area other than the face area, based on shake contributions of an entirety of the area other than the face area; and
    a shake correction unit configured to correct shake of the image sensed by the imaging unit according to the amount of face motion and the average amount of background motion detected by the motion detection unit.

2. The image taking apparatus according to claim 1, further comprising:
    a correction value calculation unit configured to calculate a correction value of the shake of the image to be corrected by the shake correction unit, in accordance with the amount of face motion and the average amount of background motion.

3. The image taking apparatus according to claim 2, wherein the correction value calculation unit calculates the correction value in accordance with the amount of face motion, the average amount of background motion and predetermined weighting factors.

4. The image taking apparatus according to claim 3, wherein the correction value calculation unit calculates the correction value by applying a greater weighting factor to the amount of face motion than to the average amount of background motion.

5. The image taking apparatus according to claim 3, wherein
    the face detection unit further detects feature information associated with the face detected in the image, and
    the correction value calculation unit calculates the weighting factors in accordance with the feature information associated with the face.

6. The image taking apparatus according to claim 5, wherein the feature information associated with the face includes one or more pieces of information selected from a group consisting of information indicating a face area size, information indicating coordinates of the face area, information indicating the likelihood of being a face, information indicating the degree of facing forward, information indicating the degree of tilt of the face, information indicating the degree of smiling, information indicating the degree of being serious, and information indicating the degree of closing of eyes.

7. The image taking apparatus according to claim 5, wherein when calculating the correction value, the correction value calculation unit increases the weighting factor for blocks located close to the face.

8. The image taking apparatus according to claim 5, further comprising:
    a camera control value detection configured to detect the degree of whether focus and/or exposure are set optimally for the face detected by the face detection unit, based on the feature information associated with the face,
    wherein the correction value calculation unit calculates the correction value for the face in accordance with the degree of whether focus and/or exposure are set optimally for the face.

9. The image taking apparatus according to claim 3, further comprising:
    a specific person storage unit configured to store specific person information associated with a face of a specific person; and
    a specific person identification unit configured to determine whether the face is identical to the face of the specific person,
    wherein the correction value calculation unit
        calculates the correction value such that when the specific person identification unit determines that the face is identical to the face of the specific person, and
        modifies the weighting factor for each area depending on whether the area includes the face of the specific person.

10. The image taking apparatus according to claim 2, wherein the correction value calculation unit calculates a first average value indicating the average of the amount of face motion, calculates the correction value for the area of the face in accordance with the first average value, and calculates the correction value for areas other than the area of the face in accordance with the average amount of background motion.

11. The image taking apparatus according to claim 10, wherein when a plurality of faces are detected, the correction value calculation unit calculates an average value of the amount of face motion for each of the faces and calculates the correction value in accordance with the calculated average value.

12. The image taking apparatus according to claim 1, wherein the motion detection unit divides the image into a plurality of areas such that the face is included in one of the areas, detects the amount of face motion from the area including the face, and detects the average amount of background motion from areas other than the area including the face.

13. The image taking apparatus according to claim 1, further comprising:
a vibration detection unit configured to detect an amount of shake due to a vibration of the image taking apparatus,
wherein the shake correction unit corrects the shake of the image in accordance with the amount of face motion and the average amount of background motion and the amount of shake.

14. The image taking apparatus according to claim 1, further comprising:
a setting unit configured to set whether to perform detection of a face in the image.

15. The image taking apparatus according to claim 1, wherein the shake correction unit corrects the shake of the image such that the area of the face is moved toward the center of the image.

16. The image taking apparatus according to claim 1, wherein the motion detection unit detects the amount of face motion of the area of the face, in the image on the basis of the correlation between the face from a current image and a face detected from a previous image detected by the imaging unit a predetermined time before detecting the current image.

17. An image processing apparatus comprising:
an image input configured to input an image;
a face detection unit configured to detect a face in the image input via the image input unit;
a motion detection unit configured to detect, via a processor, an amount of face motion indicating an amount of shake of an area of the face detected, by the face detection unit, in the image input via the image input unit and also detecting an average amount of background motion indicating an amount of shake of an area other than the face area based on shake contributions of an entirety of the area other than the face area; and
a shake correction unit configured to correct the shake of the image input via the image input unit according to the amount of face motion and the average amount of background motion detected by the motion detection unit.

18. A method of processing an image, comprising:
inputting an image;
detecting a face in the image;
detecting, by a processor, an amount of face motion indicating an amount of shake of an area of the face in the image, and detecting an average amount of background motion indicating an amount of shake of an area other than the face area based on shake contributions of an entirety of the area other than the face area; and
correcting the shake of the image according to the amount of face motion and the average amount of background motion.

19. The method of processing an image according to claim 18, further comprising calculating the correction value of the shake of the image to be corrected, in accordance with the amount of face motion and the average amount of background motion detected.

20. The method of processing an image according to claim 19, wherein calculating the correction value is in accordance with the amount of face motion and the average amount of background motion detected and in accordance with predetermined weighting factors.

21. The method of processing an image according to claim 20, wherein calculating the correction value includes applying a greater weighting factor to the amount of face motion detected than to the average amount of background motion detected.

22. The method of processing an image according to claim 20, wherein
detecting a face in the image includes detecting feature information associated with the face detected in the image; and
calculating the correction value includes calculating the weighting factors in accordance with the feature information associated with the face detected.

23. The method of processing an image according to claim 22, wherein the feature information associated with the face includes one or more pieces of information selected from a group consisting of information indicating a face area size, information indicating coordinates of the face area, information indicating the likelihood of being a face, information indicating the degree of facing forward, information indicating the degree of tilt of the face, information indicating the degree of smiling, information indicating the degree of being serious, and information indicating the degree of closing of eyes.

24. The method of processing an image according to claim 22, wherein calculating the correction value includes increasing the weighting factor for blocks located close to the face detected.

25. The method of processing an image according to claim 22, further comprising detecting the degree of whether focus and/or exposure are set optimally for the face detected, based on the feature information associated with the face,
wherein calculating the correction value for the face is in accordance with the detected degree of whether focus and/or exposure are set optimally for the face.

26. The method of processing an image according to claim 20, further comprising
storing specific person information associated with a face of a specific person; and
determining whether the face detected is identical to the face of the specific person stored, wherein
calculating the correction value includes modifying the weighting factor for each area depending on whether the area includes the face of the specific person if it is determined that the face detected is identical to the face of the specific person stored.

27. The method of processing an image according to claim 19, wherein calculating the correction value includes calculating a first average value indicating the average of the amounts of face motion detected, calculating the correction value for the area of the face detected in accordance with the first average value, and calculating the correction value for areas other than the area of the face detected in accordance with the average amount of background motion detected.

28. The method of processing an image according to claim 27, wherein, if a plurality of faces is detected, calculating the correction value is in accordance with includes calculating the average value of the amounts of face motion for each of the faces detected and calculating the correction value in accordance with the calculated average value.

29. The method of processing an image according to claim 18, wherein detecting an amount of face motion includes dividing the image inputted into a plurality of areas such that the face detected is included in one of the areas, detecting the amount of face motion from the area including the face, and detecting the average amount of background motion from areas other than the area including the face.

30. The method of processing an image according to claim 18, further comprising detecting an amount of shake due to a vibration of the image taking apparatus,
wherein correcting the shake of the image is in accordance with the amount of face motion and the average amount of background motion detected and the amount of shake due to a vibration detected.

31. The method of processing an image according to claim 18, further comprising setting whether detection of a face in the image sensed should be performed.

32. The method of processing an image according to claim 18, wherein correcting the shake of the image inputted moves the area of the face detected toward the center of the image.

33. The method of processing an image according to claim 18, wherein detecting an amount of face motion of an area of the face is based on a correlation between the face detected from the current image and a face detected from a previous image a predetermined time before the current image.

34. A non-transitory computer-readable medium encoded thereon with a program that, when executed by a computer, causes the computer to perform a method of image processing comprising:
inputting an image;
detecting a face in the image;
detecting an amount of face motion indicating an amount of shake of an area of the face in the image, and detecting an average amount of background motion indicating an amount of shake of an area other than the face area based on shake contributions of an entirety of the area other than the face area; and
correcting the shake of the image according to the amount of face motion and the average amount of background motion.

35. An image taking apparatus comprising:
imaging means for sensing an image of a subject;
face detection means for detecting a face in the image sensed by the imaging means;
motion detection means for detecting an amount of face motion indicating an amount of shake of an area of the face detected, by the face detection means, in the image sensed by the imaging means and also detecting an average amount of background motion indicating an amount of shake of an area other than the face area based on shake contributions of an entirety of the area other than the face area; and
shake correction means for correcting the shake of the image sensed by the imaging means according to the amount of face motion and the average amount of background motion detected by the motion detection means.

36. An image processing apparatus comprising:
image input means for inputting an image;
face detection means for detecting a face in the image input via the image input means;
motion detection means for detecting an amount of face motion indicating an amount of shake of an area of the face detected, by the face detection unit, in the image input via the image input means and also detecting an average amount of background motion indicating an amount of shake of an area other than the face area based on shake contributions of an entirety of the area other than the face area; and
shake correction means for correcting the shake of the image input via the image input means according to the amount of face motion and the average amount of background motion detected by the motion detection means.

* * * * *